(12) United States Patent
Ogino et al.

(10) Patent No.: US 6,883,382 B2
(45) Date of Patent: *Apr. 26, 2005

(54) PRESSURE SENSITIVE SENSOR, OBJECT DETECTING DEVICE AND OPENING, ATTACHMENT STRUCTURE THEREOF AND OPENING-AND-CLOSING DEVICE

(75) Inventors: Hiroyuki Ogino, Nara (JP); Shigeki Ueda, Yamatokohriyama (JP)

(73) Assignee: Matsushita Electric Industrial Co., Inc., Osaka (JP)

( * ) Notice: Subject to any disclaimer, the term of this patent is extended or adjusted under 35 U.S.C. 154(b) by 31 days.

This patent is subject to a terminal disclaimer.

(21) Appl. No.: 10/352,960

(22) Filed: Jan. 28, 2003

(65) Prior Publication Data

US 2004/0112139 A1 Jun. 17, 2004

(30) Foreign Application Priority Data

Dec. 17, 2002 (JP) .................................. P.2002-365427
Dec. 27, 2002 (JP) .................................. P.2002-382296

(51) Int. Cl.[7] .............................................. H01L 41/08
(52) U.S. Cl. ...................................... 73/756; 310/330
(58) Field of Search ................... 73/756, 574; 310/330, 310/319, 339, 345

(56) References Cited

U.S. PATENT DOCUMENTS

| | | | | |
|---|---|---|---|---|
| 3,903,733 A | * | 9/1975 | Murayama et al. ............ | 73/574 |
| 4,943,757 A | * | 7/1990 | Richter et al. ............... | 318/469 |
| 5,051,672 A | * | 9/1991 | Yaguchi ....................... | 318/469 |
| 5,554,907 A | * | 9/1996 | Dixon ........................... | 310/339 |
| 5,770,914 A | * | 6/1998 | Pease et al. ................. | 310/339 |
| 5,907,213 A | * | 5/1999 | Oshima et al. ............. | 310/328 |
| 5,949,207 A | * | 9/1999 | Luebke et al. .............. | 318/446 |
| 6,377,009 B1 | * | 4/2002 | Philipp ........................ | 318/468 |

FOREIGN PATENT DOCUMENTS

| | | |
|---|---|---|
| FR | 2 732 927 | 10/1996 |
| GB | 2 300 732 A | 11/1996 |
| JP | 2001-153734 | 6/2001 |
| JP | 201-324393 | 11/2001 |
| WO | WO 00/70179 | 11/2000 |

OTHER PUBLICATIONS

Patent Abstract of Japan, Publication No. 2000103228, Publication Date Apr. 11, 2000, Title "Window Frame Pressure Sensitive Device", 1 Page.

* cited by examiner

*Primary Examiner*—Edward Lefkowitz
*Assistant Examiner*—Andre Allen
(74) *Attorney, Agent, or Firm*—Pearne & Gordon LLP

(57) ABSTRACT

A pressure sensitive sensor provided in at least one of an opening section and an opening and closing section for opening and closing the opening section and serving to detect pinching of an object between the opening section and the opening and closing section based on an output signal generated by deformation upon receipt of external force, comprising pressure sensitive means 33 for generating an output signal corresponding to deformation and support means 35 for supporting the pressure sensitive means 33 on at least one of the opening section and the opening and closing section, the support means 35 including at least a first deformation section 37 having a first elastic modulus and serving to increase deformation of the pressure sensitive sensor 17, and a second deformation section 39 having a second elastic modulus which is higher than the first elastic modulus.

21 Claims, 19 Drawing Sheets

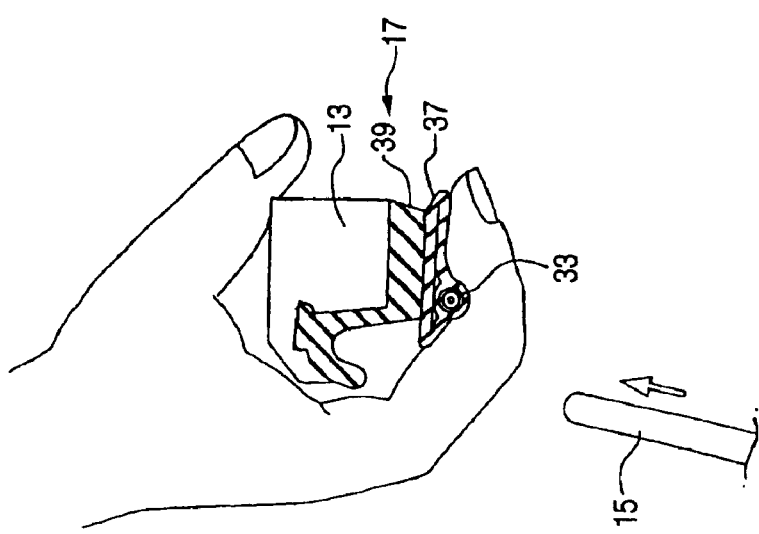
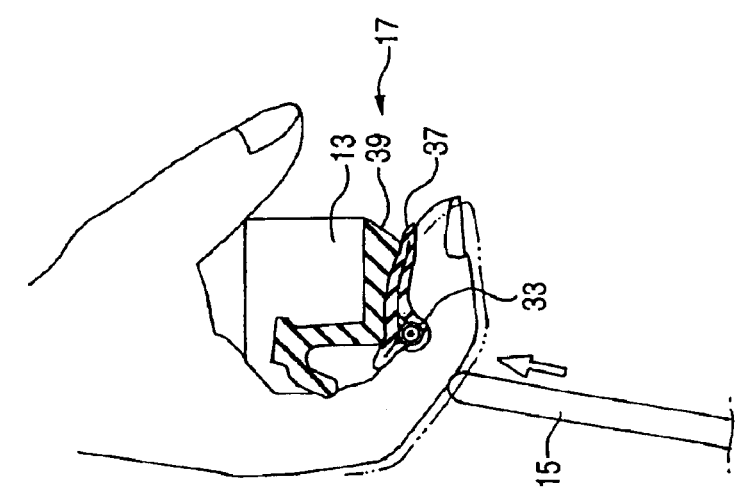
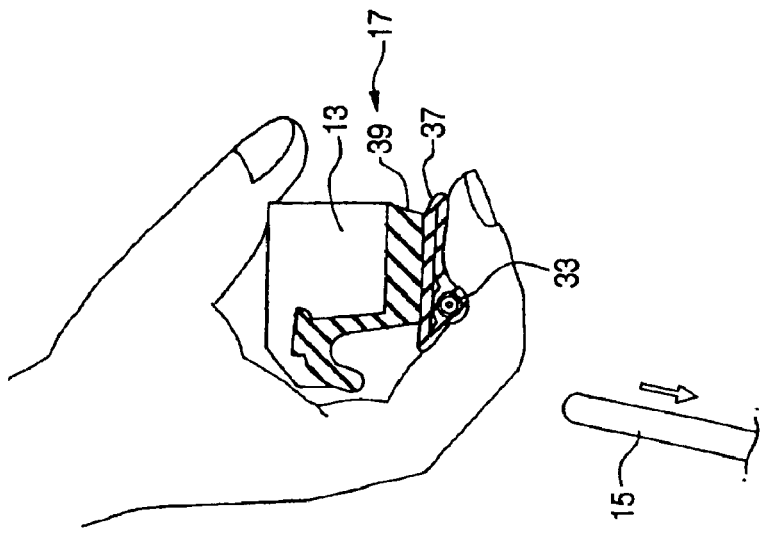

----- : BEFORE SENSOR DEFORMATION
———— : AFTER SENSOR DEFORMATION

PRESSURE SENSITIVE SENSOR, OBJECT DETECTING DEVICE AND OPENING, ATTACHMENT STRUCTURE THEREOF AND OPENING-AND-CLOSING DEVICE

BACKGROUND OF THE INVENTION

The present invention relates to a pressure sensitive sensor, an object-detecting device, attachment structure thereof and an opening and closing device. More particularly, the invention relates to a technique for improvement to reliably operate a sensor and a pressure sensitive sensor attachment structure and an opening and closing device which are suitably used for a power window device of a car which requires an object pinching preventing function.

Conventionally, there have been disclosed many examples in which a pressure sensitive sensor of such a type as to close a contact point by pressing or a piezoelectric sensor utilizing a piezoelectric element is used for a pressure sensitive sensor to be used for preventing an object from being pinched. When the piezoelectric sensor is deformed by the pressing of an object, a voltage pulse is output from the piezoelectric sensor and the presence of pinching of the object is detected based on the presence of the voltage pulse. In the case in which these pressure sensitive sensors are applied to prevent pinching in the power window device of a car, a pressure sensitive switch or a piezoelectric sensor is provided along the window frame of a door and is deformed by an object when the object is pinched between the window frame and a windowpane, for example. If the pressure sensitive switch is closed or a predetermined voltage pulse is output from the piezoelectric sensor when the windowpane is to be closed, it is assumed that the object is pinched and the direction of rotation of an electric motor is reversed to eliminate the pinching.

There has been proposed the pinching detecting device for the power window device of this type comprising a pressure sensitive sensor 210 having conductive contact wires 202, 203, 204 and 205 opposed on the inner circumference of a long string-shaped elastic cylinder 201 which is buried in elastic support means provided along the edge of a window frame as shown in FIGS. 22A and 22B (for example, see Japanese Patent Document JP-A-2001-153734).

The pressure sensitive sensor 210 serves to output a predetermined detection signal when conductive contact wires to be opposed to each other in the elastic cylinder 201 come in contact with each other as shown in FIG. 23B when the elastic cylinder 201 is crushed in a constant amount or more by pinching an object.

In the pinching detecting device using the pressure sensitive sensor 210, however, when the pressure sensitive sensor 210 is bent as shown in FIG. 23A corresponding to the corner section of a window frame in order to be provided along the corner section of the window frame in the front seat of a vehicle, for example, there is a possibility that the elastic cylinder 201 might be crushed in a bending position and the contact wires might thereby come in contact with each other, resulting in erroneous detection as shown in FIG. 23B. For this reason, the pressure sensitive sensor 210 has conventionally been provided independently for each of almost rectilinear sides constituting the window frame such that one pressure sensitive sensor 210 is not provided across the corner section of the window frame.

In such a pressure sensitive sensor attachment structure, however, there is a problem in that the number of the pressure sensitive sensors 210 to be used is increased and a great deal of time and labor is required for a processing of connecting a lead wire from each pressure sensitive sensor 210.

In the pressure sensitive sensor attachment structure, moreover, a pressure sensitive sensor is not present in the corner section itself of a window frame. For this reason, there is a possibility that the local pinching of an object in the corner section of the window frame might not be detected.

In the pressure sensitive sensor 210, furthermore, even if the section of the pressure sensitive sensor 210 is crushed due to the pinching of an object, the contact of the contact wires is not generated until the section is crushed in a constant amount or more. Consequently, the pinching is detected with a delay. As a result, there is a problem in that an operation for closing a windowpane is stopped with a delay.

In the case in which an inclined side is provided on the window frame as in an opening and closing door in the front seat of a vehicle, force acting in such a direction as to deform the section of the pressure sensitive sensor 210 is changed into a component of force which is smaller than force for lifting a windowpane pinching an object when the object is pinched in the pressure sensitive sensor 210 provided on the inclined side. As a result, the elastic cylinder 201 is not sufficiently deformed elastically. Finally, there is a possibility that the pinching of the object might not be detected quickly.

On the other hand, in the piezoelectric sensor, moreover, there is a problem in that the piezoelectric sensor is fixed to the window frame and is thus deformed with difficulty even if the object presses the piezoelectric sensor, and a voltage pulse having a sufficient magnitude for detection is not generated from the piezoelectric sensor when pinching is to be detected. For this reason, the voltage pulse having a sufficient magnitude is not output from the piezoelectric sensor. Therefore, a windowpane continuously carries out a closing operation until the voltage pulse has a detection threshold or more for the pinching. Consequently, there is a possibility that a load applied to the object might be increased to damage the object before the pinching is eliminated.

Therefore, there has been disclosed in Japanese Patent Document JP-A-2001-324393 a technique in which a pressure sensitive sensor utilizing a novel piezoelectric element formed like a flexible wire and serving to generate an output signal corresponding to the acceleration component of deformation is used to enhance a detection sensitivity, thereby producing great pinching prevention effects (see FIGS. 1, 2 and 4).

The pressure sensitive sensor for generating an output signal corresponding to an acceleration component is attached to a window frame 1 with a structure shown in FIG. 14. More specifically, a pressure sensitive sensor 4 comprises a flexible piezoelectric sensor 2 and support means 3, and the support means 3 has the piezoelectric sensor 2 provided in the vicinity of a lowermost portion and is formed of an elastic member such as rubber having a flexibility or a foamed resin member. Moreover, the thickness of the support means 3 provided around the piezoelectric sensor 2 is reduced such that the piezoelectric sensor 2 can easily be deformed. The support means 3 has a deformation increasing section including a hollow section 4 and a side wall section 5 which serves to increase the deformation of the piezoelectric sensor 2.

In the attachment structure, the deformation of the piezoelectric sensor 2 is mainly increased by the deformation of the deformation increasing section so that a high detection sensitivity can be realized. As a result of the vigorous investigations of the inventors, however, it could be known that a detection capability can be enhanced still more at a low cost by varying the signal processing of the piezoelectric sensor 2 or changing the shape of the support means 3.

SUMMARY OF THE INVENTION

It is a first object of the invention to provide a pressure sensitive sensor, an object detecting device and an opening and closing device which use a piezoelectric sensor for detecting an acceleration component to stably detect an object with high precision in any situation and are inexpensive.

Second object is to provide a pressure sensitive sensor attachment structure and an opening and closing device which can detect the generation of pinching reliably and rapidly also in an inclined section and a corner section in a window frame, and furthermore, can use only one pressure sensitive sensor to be provided and can easily carry out the processing of a lead wire led from the pressure sensitive sensor.

The first object can be achieved by the following structure.

(1) A pressure sensitive sensor provided in at least one of an opening section and an opening and closing section for opening and closing the opening section and serving to detect pinching of an object between the opening section and the opening and closing section based on an output signal generated by deformation upon receipt of external force, comprising pressure sensitive means for generating an output signal corresponding to deformation and support means for supporting the pressure sensitive means on at least one of the opening section and the opening and closing section, the support means including at least a first deformation section having a first elastic modulus and serving to increase deformation of the pressure sensitive sensor, and a second deformation section having a second elastic modulus which is higher than the first elastic modulus.

(2) The pressure sensitive sensor according to (1), wherein the first deformation section has a hollow section and a side wall section.

(3) The pressure sensitive sensor according to (1) or (2), wherein the first deformation section and the second deformation section are formed separately and are bonded to each other.

(4) The pressure sensitive sensor according to (1) or (2), wherein the second deformation section is formed integrally with a part of a weather strip of a car.

(5) The pressure sensitive sensor according to (1) or (2), wherein the second deformation section is a window frame of a car.

(6) The pressure sensitive sensor according to (2), wherein the first deformation section and the second deformation section are formed integrally and the second deformation section has a smaller gap than the hollow section.

(7) The pressure sensitive sensor according to any of (1) to (6), wherein the pressure sensitive means is molded by using a compound piezoelectric member mixing chlorinated polyethylene and piezoelectric ceramics powder.

(8) An object detecting device comprising the pressure sensitive sensor according to any of (1) to (7), and deciding means for deciding presence of a contact of an object with the pressure sensitive sensor based on a signal output from the pressure sensitive sensor.

(9) The object detecting device according to (8), wherein the deciding means outputs a decision signal when the signal output from the pressure sensitive means has a preset first change amount or more.

(10) The object detecting device according to (9), wherein the deciding means holds the decision signal until the signal output from the pressure sensitive means which has a different polarity from the polarity of the output signal has a preset second change amount or more after the signal output from the pressure sensitive means has the first change amount or more.

(11) An object detecting device provided in at least one of an opening section and an opening and closing section for opening and closing the opening section and serving to detect pinching of an object between the opening section and the opening and closing section based on an output signal generated by deformation upon receipt of external force, and deciding means for deciding presence of a contact of the object with the pressure sensitive sensor based on a signal output from the pressure sensitive sensor, the pressure sensitive sensor including pressure sensitive means for generating an output signal corresponding to deformation and support means for supporting the pressure sensitive means on at least one of the opening section and the opening and closing section, and the deciding means outputting a decision signal when the signal output from the pressure sensitive means has a preset first change amount or more, and holding the decision signal until the signal output from the pressure sensitive means which has a different polarity from the polarity of the output signal has a preset second change amount or more after the decision signal is output.

(12) An opening and closing device comprising the object detecting device according to any of (8) to (11), driving means for driving an opening and closing section, and control means for controlling the driving means to stop a closing operation of the opening and closing section or to cause the opening and closing section to carry out an opening operation when deciding means decides a contact of an object with a pressure sensitive sensor when the opening and closing section carries out the closing operation.

The second object can be achieved by a pressure sensitive sensor attachment structure and an opening and closing device which have the following structures.

(13) A pressure sensitive sensor attachment structure provided in at least one of an opening section having an inclined side and another side connected thereto through a corner section and an opening and closing member for opening and closing the opening section and serving to detect pinching of an object between the opening section and the opening and closing member, wherein the pressure sensitive sensor has a flexibility and is long, and is inserted in elastic support means to be supported on the opening section or the opening and closing member, and is provided on at least the inclined side of the opening section.

(14) A pressure sensitive sensor attachment structure provided in at least one of an opening section having an inclined side and another side connected thereto through a corner section and an opening and closing member for opening and closing the opening section and serving to detect pinching of an object between the opening section and the opening and closing member, wherein the pressure sensitive sensor has a flexibility and is formed like a long shaft, and is inserted in elastic support means to be supported on the opening section or the opening and closing member, and the single continuous pressure sensitive sensor is inserted in the elastic support means in a region including the inclined side and another side.

(15) The pressure sensitive sensor attachment structure according to (13) or (14), wherein the pressure sensitive sensor serves to output an electric signal corresponding to a deformation acceleration in elastic deformation.

(16) The pressure sensitive sensor attachment structure according to any of (13) to (15), wherein a piezoelectric element material of the pressure sensitive sensor is formed by a compound piezoelectric member mixing chlorinated polyethylene and piezoelectric ceramics powder.

(17) The pressure sensitive sensor attachment structure according to any of (13) to (16), wherein a surface of the elastic support means is subjected to a high friction processing.

(18) The pressure sensitive sensor attachment structure according to any of (13) to (16), wherein a surface of the whole elastic support means or a part thereof is a surface from which a material surface having no coating layer is exposed.

(19) An opening and closing device comprising a pressure sensitive sensor attached with the pressure sensitive sensor attachment structure according to any of (13) to (18), deciding means for deciding presence of a contact of an object with the pressure sensitive sensor based on a signal output from the pressure sensitive sensor, opening and closing means for operating the opening and closing member for opening and closing the opening section, and control means for controlling the opening and closing means in order to stop the operation of the opening and closing member or to start an opening operation of the opening and closing member when the deciding means decides that the contact with the object is caused in response to an electric signal sent from the pressure sensitive sensor.

BRIEF DESCRIPTION OF THE DRAWINGS

FIGS. 9A to 9C are views showing a state in which a pressure is detected in a compression state, FIG. 9A being an explanatory view showing the application of a static load, FIG. 9B being an explanatory view showing a state in which a pressure is further applied, and FIG. 9C being an explanatory view showing a state in which a pressure is detected to return a windowpane;

DETAILED DESCRIPTION OF THE PREFERRED EMBODIMENTS

First Embodiment

A preferred embodiment of a pressure sensitive sensor, an object detecting device and an opening and closing device according to the invention will be described below in detail with reference to the drawings.

Figure 1:
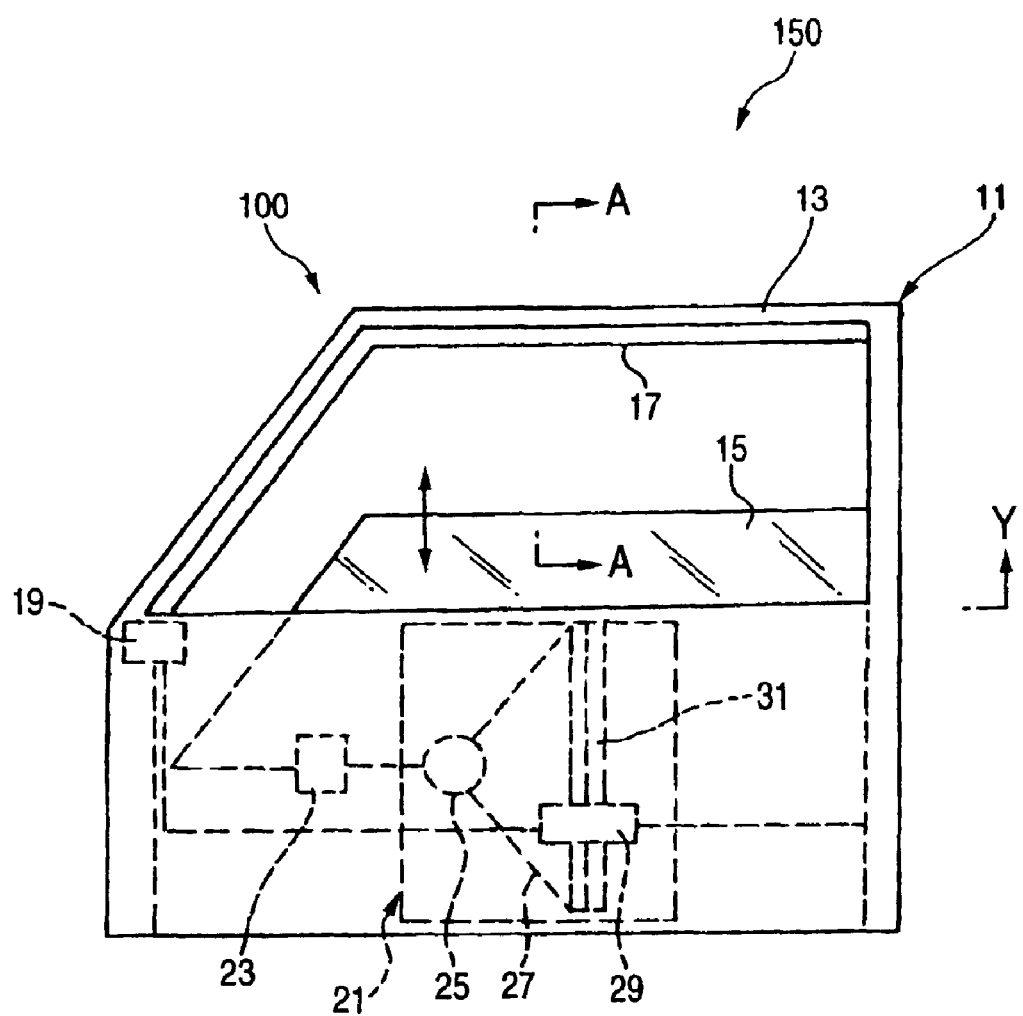
FIG. 1 is a view showing the appearance of an object detecting device comprising a pressure sensitive sensor and an opening and closing device according to the invention.
Figure 2A:
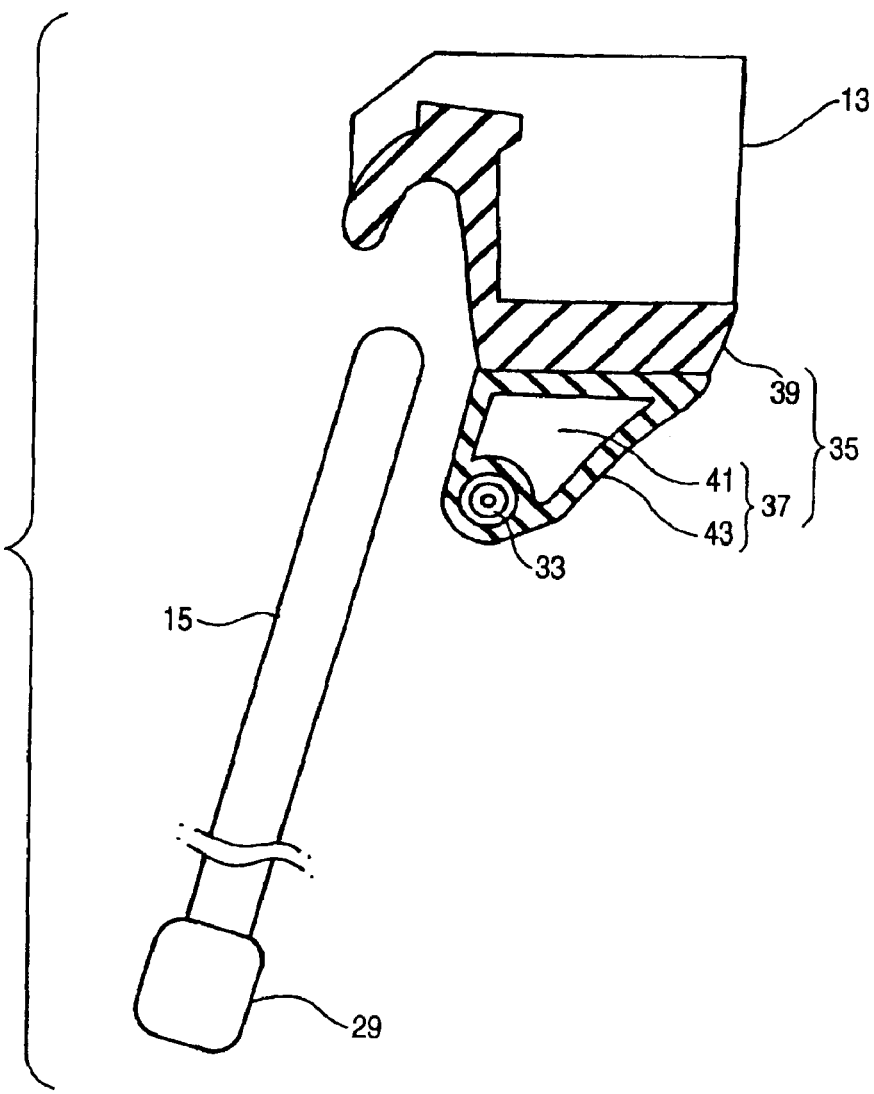
FIGS. 2A and 2B are views showing the structure of an A—A section in FIG. 1.

FIG. 1 is a view showing the appearance of an object detecting device 100 comprising a pressure sensitive sensor and an opening and closing device 150 according to the invention, illustrating an example of the case in which they are applied to the power window of a car. FIG. 2A is a view showing the structure of an A—A section in FIG. 1. In FIG. 2A, the right side indicates an inside of a vehicle compartment and the left side indicates an outside of the vehicle compartment.

First of all, the basic structure of the object detecting device 100 according to the embodiment is as follows. In FIG. 1, 11 denotes a door of a car, 13 denotes a window frame to be an opening section, and 15 denotes a windowpane to be an opening and closing section. 17 denotes a pressure sensitive sensor which is provided on the peripheral edge of the end of the window frame 13. 19 denotes deciding means for deciding a contact of an object with the pressure sensitive sensor 17 based on the output signal of the pressure sensitive sensor 17.

Moreover, the switch gear 150 according to the embodiment is constituted by the object detecting device 100, driving means 21 for opening and closing the windowpane 15, and control means 23 for controlling the driving means 21. The driving means 21 is constituted by a motor 25, a wire 27, a support tool 29 for the windowpane 15, and a guide 31. The wire 27 is moved by the motor 25, and the support tool 29 coupled to the wire 27 is vertically moved along the guide 31 so that the windowpane 15 is opened and closed. The driving means 21 is not restricted to a method using the wire 27 described above but may employ another method. Moreover, the control means 23 maybe integrated with the motor 25.

As shown in FIG. 2, the pressure sensitive sensor 17 according to the embodiment comprises a flexible piezoelectric sensor 33 to be pressure sensitive means, and support means 35. The support means 35 comprises a first deformation section 37 having the piezoelectric sensor 33 provided in the vicinity of a lowermost portion and formed of an elastic member such as rubber or a foamed resin member, and a second deformation section 39 bonded to the first deformation section 37 and fixed to the window frame 13. More specifically, the first deformation section 37 has a follow section 41 and a side wall section 43, and a macro elastic modulus obtained by integrating the hollow section 41 and the sidewall section 43 is represented by E1 (a first elastic modulus). On the other hand, a macro elastic modulus of the second deformation section 39 is represented by E2 (a second elastic modulus) which is greater than E1. In other words, in the first deformation section 37, the thickness of the support means 35 provided around the piezoelectric sensor 33 is reduced such that the piezoelectric sensor 33 can easily be deformed, and the deformation of the piezoelectric sensor 33 is increased. Moreover, the second deformation section 39 sets the macro elastic modulus E2 to be greater than the elastic modulus E1 of the first deformation section, thereby obtaining the behavior of the deformation of the support means 35 in which the first deformation section 37 is crushed and the second deformation section 39 is then crushed. The second deformation section 39 is integrated with a weather strip provided in the window frame 13. The support means 35 is not restricted to a two-stage structure but a third deformation section may be further provided.

Moreover, thermoplastic elastomer (TPE) can be applied to the first deformation section 37 and ethylene propylene rubber (EPDM) can be applied to the second deformation section 39, for example.

Furthermore, the pressure sensitive sensor 17 is not restricted to the opening section side but may be provided on the opening and closing side.

Figure 3:
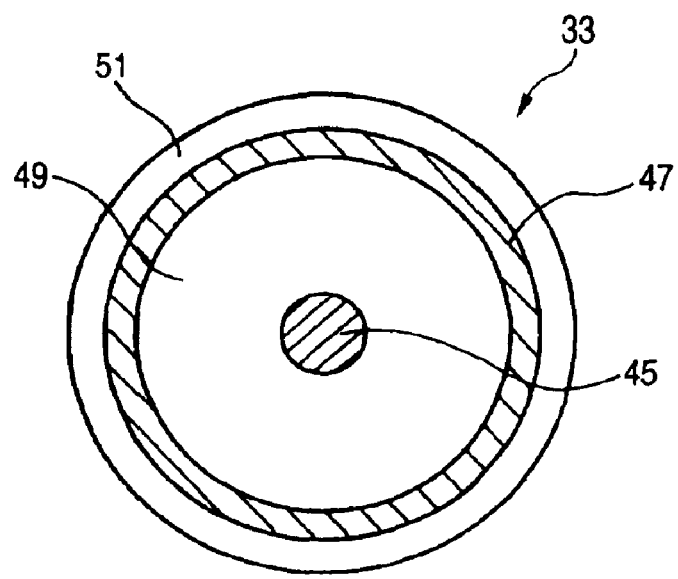
FIG. 3 is a view showing the structure of the section of a piezoelectric sensor.

FIG. 3 is a view showing the structure of the section of the piezoelectric sensor 33. The piezoelectric sensor 33 has such a structure that a center electrode 45 to be an electrode for leading a signal, a ground electrode 47, a compound piezoelectric layer 49 formed by a compound piezoelectric member mixing the sintered powder of piezoelectric ceramic with a rubber elastic member formed of chlorinated polyethylene, and a covering layer 51 are laminated concentrically, are molded like a cable and are polarized, and has a high flexibility and generates an output signal corresponding to deformation. The sintered powder of lead titanate or lead zirconate titanate is used for the piezoelectric ceramic, for example. The piezoelectric sensor 33 is manufactured in the following procedure. First of all, a chlorinated polyethylene sheet and piezoelectric ceramic having (40 to 70) vol % (lead zirconate titanate) powder are uniformly mixed like a sheet by a roll method. The sheet is cut into small pellet-shaped pieces, and the pellets are extruded continuously together with the center electrode 45, thereby forming the compound piezoelectric layer 49. Then, the ground electrode 47 is wound around the compound piezoelectric layer 49. The covering layer 51 is also extruded continuously to surround the ground electrode 47. Finally, a high DC voltage of (5 to 10) kV/mm is applied between the center electrode 45 and the ground electrode 47 in order to polarize the compound piezoelectric layer 49.

When the piezoelectric ceramic powder is to be added to the chlorinated polyethylene, it is preferable that the piezoelectric ceramic powder should be previously immersed in a solution of a titanium and coupling agent and should be dried. By this treatment, the surface of the piezoelectric ceramic powder is covered with a hydrophilic group and a hydrophobic group which are contained in the titanium and coupling agent. The hydrophilic group prevents the coagulation of the piezoelectric ceramic powder, and furthermore, the hydrophobic group increases a wettability of the chlorinated polyethylene and the piezoelectric ceramic powder. As a result, the piezoelectric ceramic powder can be uniformly added in a large amount up to 70 vol % at a maximum in the chlorinated polyethylene. It has been found that the same effects can be obtained by adding the titanium and coupling agent during the rolling of the chlorinated polyethylene and the piezoelectric ceramic powder in place of the immersion in the titanium and coupling agent solution. This treatment is excellent in that the immersion treatment in the titanium and coupling agent solution is not specially required. Thus, the chlorinated polyethylene also plays a part of a binder resin in the mixture of the piezoelectric ceramic powder.

While an ordinary metallic single conductor may be used for the center electrode 45, an electrode obtained by winding a metallic coil around an insulating polymeric fiber is used. Polyester fiber which has been commercially used in an electric blanket and a copper alloy containing 5 wt % of silver are preferable for the insulating polymeric fiber and the metallic coil, respectively.

The ground electrode 47 has such a structure that a band-shaped electrode having a metal film bonded onto a polymer layer is used and is wound around the compound piezoelectric layer 49. Since an electrode using polyethylene terephthalate (PET) as the polymer layer and having an aluminum film bonded thereto has a high thermal stability at 120° C. and is also mass-produced commercially, it is preferable for the ground electrode 47. The electrode can be connected to the deciding means 19 through caulking or holdfast, for example. Moreover, a metallic single coil or a metallic braided wire may be wound around the aluminum film of the ground electrode 47 and may be thus conducted to the aluminum film, and the metallic single coil or the metallic braided wire may be soldered to the deciding means 19. Since the soldering can be carried out, the efficiency of a work can be enhanced. In order to shield the piezoelectric sensor from the electrical noise of an external environment, it is preferable that the ground electrode 47 should be wound around the compound piezoelectric layer 49 with overlapping.

While it is preferable that vinyl chloride or polyethylene should be used for the covering layer 51, an elastic material such as rubber having a higher flexibility than that of the compound piezoelectric layer 49 may be used such that the piezoelectric sensor 33 can be deformed easily in the pressing of an object. In consideration of a heat resistance and a cold resistance of vehicle parts, a material is selected. More specifically, it is preferable that a material having a small reduction in a flexibility at −30° C. to 85° C. should be selected. For such rubber, for example, it is preferable to use ethylene-propylene rubber (EPDM), chloroprene rubber (CR), butyl rubber (IIR), silicone rubber (Si) or thermoplastic elastomer. By the structure described above, the minimum curvature of the piezoelectric sensor 33 can have a radius of 5 mm at a maximum.

As described above, since the compound piezoelectric member of the piezoelectric sensor 33 has the flexibility of the chlorinated polyethylene and the high temperature durability of the piezoelectric ceramic, a sensitivity is not reduced at a high temperature as in a conventional piezoelectric sensor using polyvinylidene fluoride as a piezoelectric and a high temperature durability is great, and furthermore, a vulcanizing step is not required during molding like rubber such as EPDM. Consequently, it is possible to obtain an advantage that a production efficiency is high.

Figure 4:
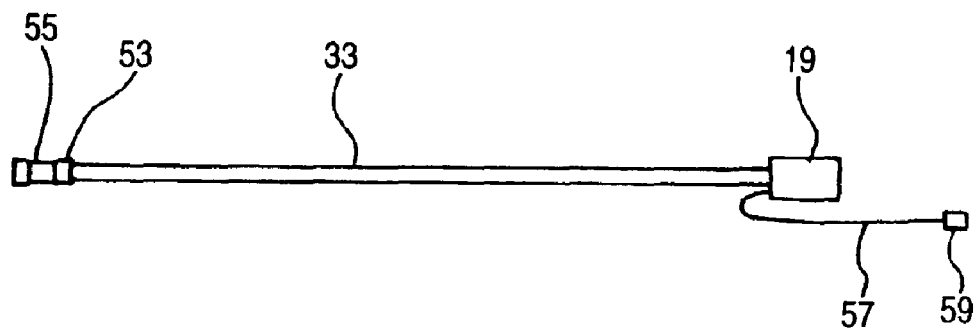
FIG. 4 is a view showing the appearance of the piezoelectric sensor.

FIG. 4 is a view showing the appearance of the piezoelectric sensor 33, in which a resistor 55 for disconnection detection is provided in an end 53 of the piezoelectric sensor 33. The resistor 55 for disconnection detection is connected between the center electrode 45 and the ground electrode 47 in the piezoelectric sensor 33. The resistor 55 for disconnection detection also serves as a discharge section for discharging an electric charge generated in the piezoelectric sensor 33 by a pyroelectric effect so that components are rationalized. The piezoelectric sensor 33 is directly connected to the deciding means 19, and the piezoelectric sensor 33 and the deciding means 19 are thus integrated. Moreover, a cable 57 for supplying a power and outputting a detection signal and a connector 59 are connected to the deciding means 19. In the case in which the piezoelectric sensor 33 is provided in the support means 35, the resistor 55 for disconnection detection is provided in the end 53 and the piezoelectric sensor 33 is inserted in the support means 35, and the piezoelectric sensor 33 and the deciding means 19 are then connected and integrated with each other. At the same time that the support means 35 is to be molded by extrusion molding, the piezoelectric sensor 33 maybe extruded and provided in the support means 35 and the resistor 55 for disconnection detection maybe then provided in the end 53, and the piezoelectric sensor 33 and the deciding means 19 may be thus integrated.

Figure 5:
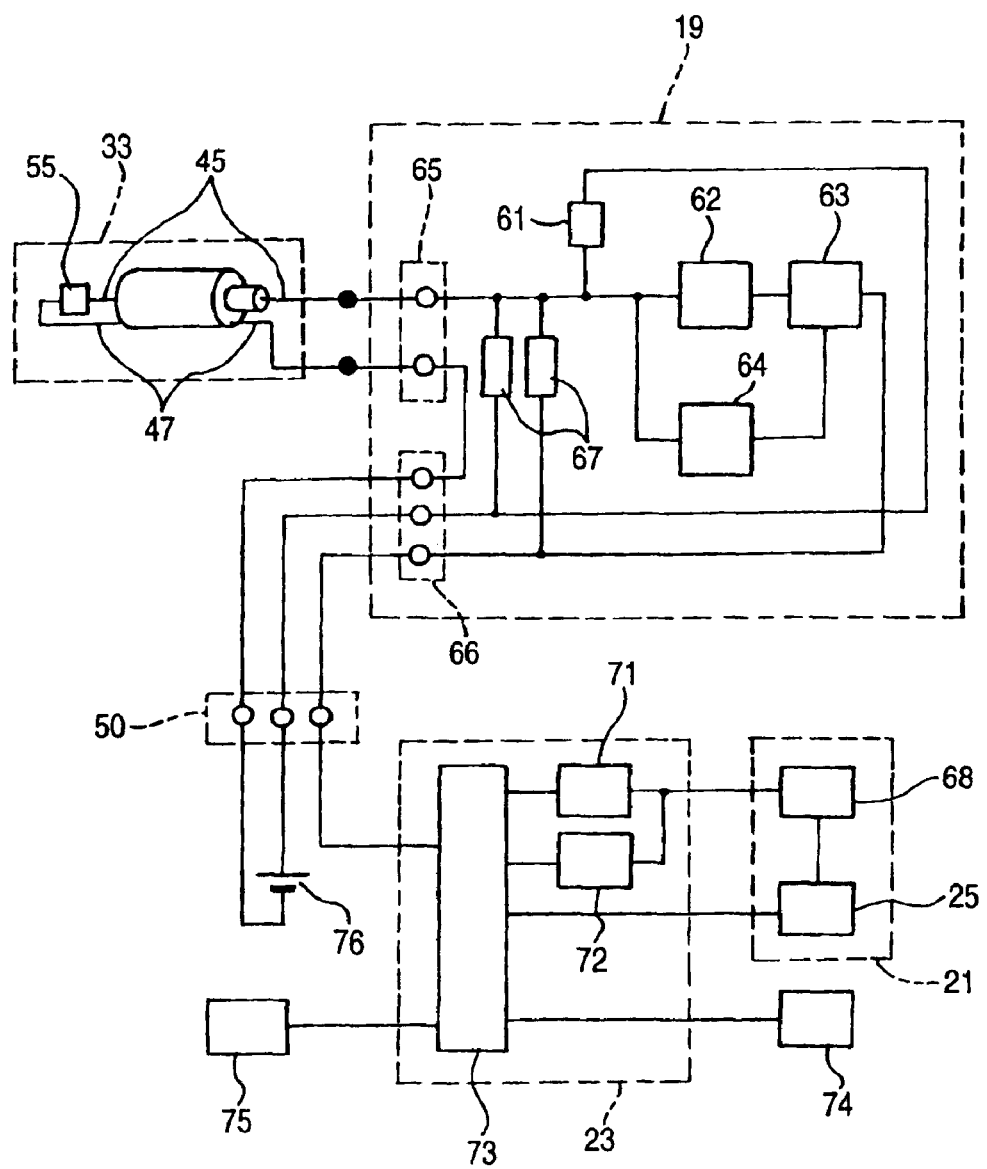
FIG. 5 is a block diagram showing the object detecting device and the opening and closing device.

FIG. 5 is a block diagram showing the object detecting device and the opening and closing device according to the embodiment. The deciding means 19 comprises a resistor 61 for voltage division which is used for detecting the disconnection of the pressure sensitive sensor 17, a filtering section 62 for passing only a predetermined frequency component from an output signal sent from the piezoelectric sensor 33, a deciding section 63 for deciding the contact of an object with the pressure sensitive sensor 17 based on an output signal sent from the filtering section 62, and an abnormality deciding section 64 for deciding the abnormality of the disconnection of the center electrode 45 and the ground electrode 47 in the piezoelectric sensor 33 from a voltage value formed by the resistor 55 for disconnection detection and the resistor 61 for voltage division. Moreover, a signal input section 65 for connecting the center electrode 45 and the ground electrode 47 to the deciding means 19 and for inputting a signal output from the piezoelectric sensor 33 to the deciding means 19 and a signal output section 66 for outputting a decision signal sent from the deciding section 63 are provided adjacently in the deciding means 19. A power line and a ground line to reach the deciding means 19 are also connected to the signal output section 66. Furthermore, the deciding means 19 has a bypass section 67 such as a capacitor provided between the signal input section 65 and the signal output section 66 and serving to bypass a high frequency signal.

The driving means 21 has a hole element 68 for detecting the rotation pulse of the motor 25.

The control means 23 comprises a position detecting section 71 for detecting the position of the upper end of the windowpane 15 based on an output signal sent from the hole element 68, an opening and closing section contact deciding section 72 for detecting the moving speed of the windowpane 15 based on the output signal sent from the hole element 68, thereby deciding the contact of an object with the windowpane 15, and a control section 73 for controlling the motor 25 based on the output signals of the deciding means 19, the position detecting section 71 and the opening and closing section contact deciding section 72.

The position detecting section 71 counts and stores a pulse signal output from the hole element 68, thereby detecting the current position of the upper end of the windowpane 15. A position Y of the upper end of the windowpane 15 is represented by a height from the lowermost point of the window frame 13 as shown in FIG. 1.

The opening and closing section contact deciding section 72 calculates the moving speed of the windowpane 15 from the pulse separation of a pulse signal output from the hole element 68 based on the fact that the moving speed of the windowpane 15 is reduced when an object comes in contact with the windowpane 15, and decides that the object comes in contact with the windowpane 15 and outputs a pulse signal of Lo→Hi→Lo if a change amount $|\Delta V_w|$ per unit time of the moving speed thus calculated is greater than a preset value $V_{w1}$. Any pulse signal having an Hi level is set to be a decision signal.

Moreover, reporting means 74 for reporting the result of the decision of the deciding means 19 by means of a predetermined light provided on a front panel in a vehicle compartment and an opening and closing switch 75 for opening and closing the windowpane 15 are connected to the control means 23, and the opening and closing switch 75 includes an auto-up switch and an auto-down switch for opening and closing the windowpane 15 by a one-touch operation, and a manual-up switch and a manual-down switch for opening and closing the windowpane 15 by a manual operation. There is provided a power supply 76 comprising a battery of a car which serves to supply a power through the deciding means 19.

The filtering section 62 has such a filtering characteristic as to remove an unnecessary signal caused by the vibration of the body of a car from the output signal of the piezoelectric sensor 33 and to extract only a peculiar frequency component appearing on the output signal of the piezoelectric sensor 33 when the piezoelectric sensor 33 is deformed by pressing due to the contact of an object. In order to determine the filtering characteristic, it is preferable that the vibration characteristic of the body of the car or the vibration of the body during running should be analyzed and optimized.

In order to remove an external electrical noise, the deciding means 19 is wholly covered with a shield member and is thus shielded electrically. Moreover, the ground electrode 47 is conducted to the shield member of the deciding means 19 and the pressure sensitive sensor 17 is also shielded electrically. A countermeasure for a high electric field may be taken by adding a feed-through capacitor or an EMI filter to the input/output section of the circuit.

Next, description will be given to a basic operation for detecting the contact of an object with the pressure sensitive sensor 17 by the object detecting device.

Figure 6:
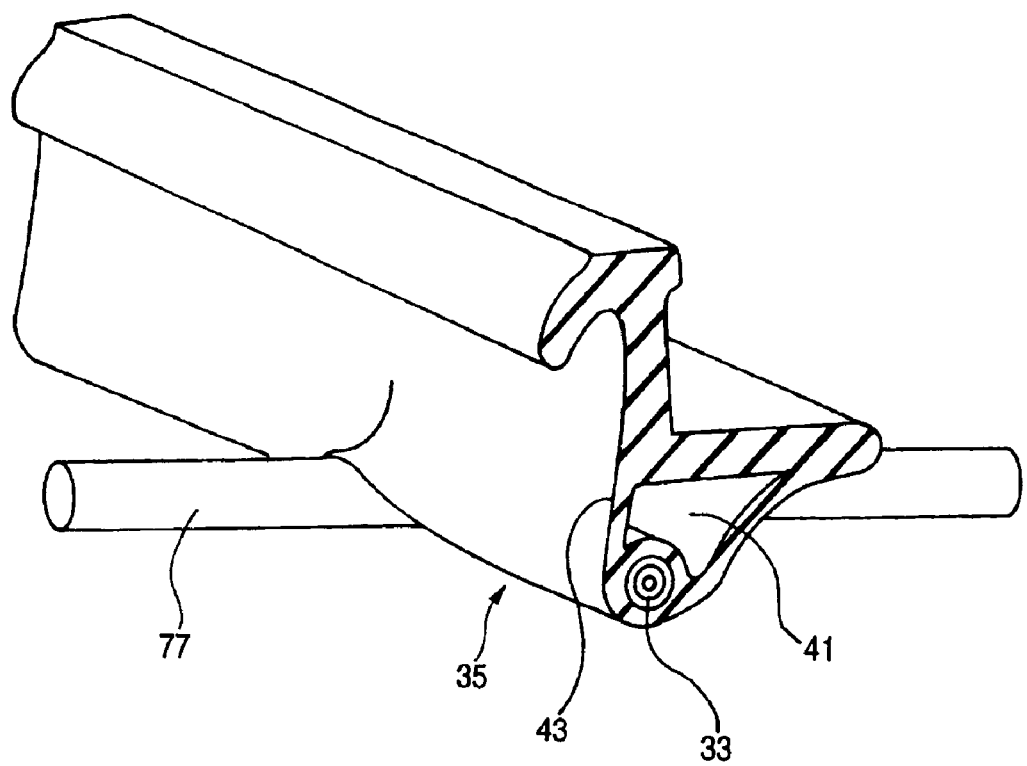
FIG. 6 is an explanatory view showing the state of the pressure sensitive sensor which is obtained when an object enters and is pinched between a window frame and a windowpane.

FIG. 6 shows the state of the pressure sensitive sensor 17 in the case in which an object 77 enters and is pinched between a window frame and a windowpane. When the object 77 comes in contact with the photosensitive sensor 17, the pressing of the object 77 is applied to the support means 35 and the piezoelectric sensor 33. The support means 35 has a more flexibility than the piezoelectric sensor 33. Therefore, the support means 35 is compressed by the pressing around a point in which the object 77 comes in contact as shown so that the side wall section 43 is deformed and the hollow section 41 is crushed simultaneously. Consequently, the piezoelectric sensor 33 is also bent and deformed around a point in which the object 77 comes in contact with the support means 35. Moreover, also when the window frame including the pressure sensitive sensor 17 is gripped by hand, the same deformation is generated in the pressure sensitive sensor 17.

When the piezoelectric sensor 33 is thus deformed, an output signal corresponding to the deformation is output from the piezoelectric sensor 33 by a piezoelectric effect. The signal output from the piezoelectric sensor 33 is filtered by the filtering section 62. In some cases, an output signal generated by an unnecessary vibration component caused by the vibration of the body of a car appears in the output signal of the piezoelectric sensor 33. The filtering section 62 removes the unnecessary signal.

Figure 7A:
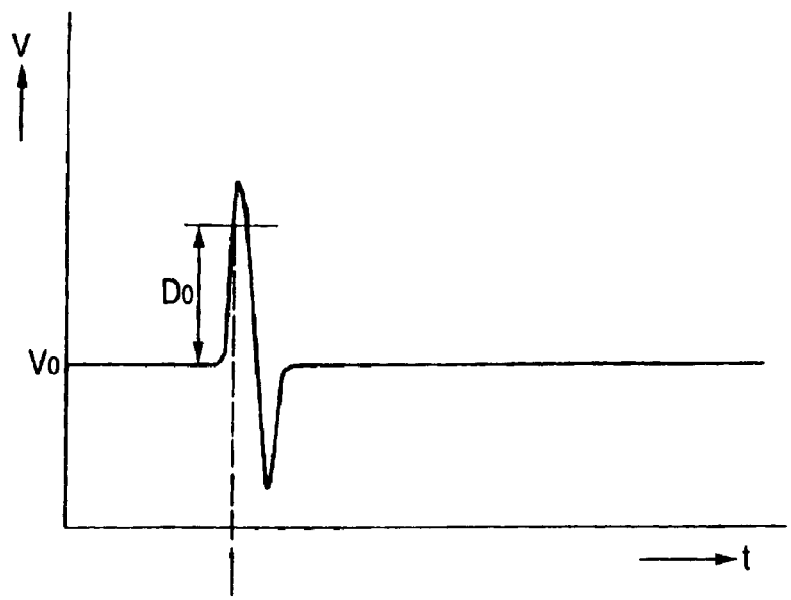
FIGS. 7A to 7C are characteristic charts showing an output signal sent from a filtering section, the decision output of deciding means and a voltage applied to a motor.
Figure 7B:
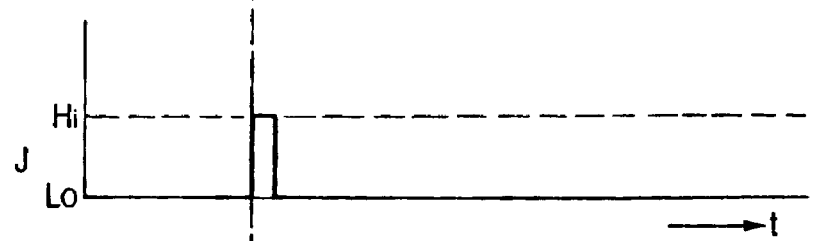
Figure 7C:
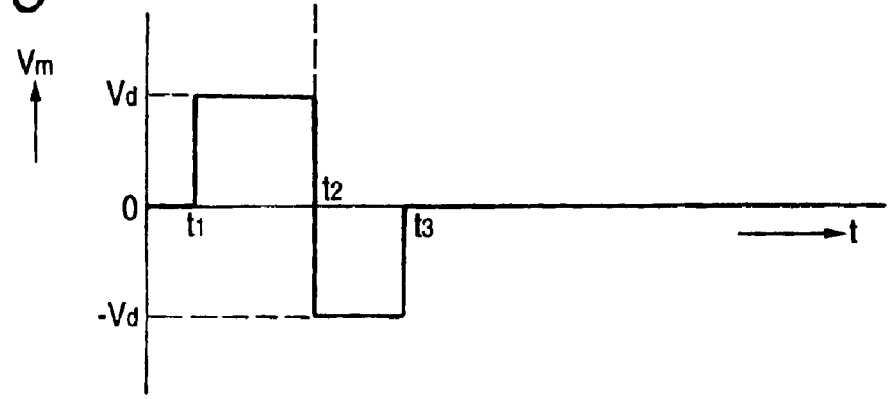

A procedure for the operations of the deciding section 63 and the control section 73 will be described with reference to FIGS. 7A to 7C. FIGS. 7A to 7C are characteristic charts showing an output signal V sent from the filtering section 62, a decision output J of the deciding means 19, and a voltage $V_m$ to be applied to the motor 25. In FIGS. 7A to 7C, an axis of ordinate indicates V, J and $V_m$ from the top and an axis of abscissa indicates a time t. When the auto-up switch of the opening and closing switch 75 is turned ON at a time $t_1$, the control section 73 applies a voltage of $+V_d$ to the motor 25 to cause the windowpane 15 to carry out a closing operation. The deciding means 19 carries out a deciding operation during the closing operation of the windowpane 15. When the object 77 is pinched as shown in FIG. 6, a signal corresponding to the acceleration of the deformation of the piezoelectric sensor 33 is output from the piezoelectric sensor 33 by the piezoelectric effect and a greater signal component than a reference potential $V_0$ shown in FIG. 7A appears from the filtering section 62. In this case, with such a structure that the piezoelectric sensor 33 is simply provided in the window frame 13, the piezoelectric sensor 33 is slightly deformed during pinching. In the embodiment, the support means 35 has a flexibility as shown in FIG. 2 and is easily compressed during the pinching so that the amount of the deformation of the piezoelectric sensor 33 is increased.

Since the hollow section 41 is also crushed during the pinching, the amount of the deformation of the piezoelectric sensor 33 is further increased. Thus, the large amount of the deformation can be obtained for the piezoelectric sensor 33 and an acceleration to be a secondary differential value of the amount of the deformation is also increased. As a result, the output signal of the piezoelectric sensor 33 is also increased. The deciding section 63 decides that a contact with the object 77 is caused if an amplitude of $|V-V_0|$ of V from $V_0$ is greater than $D_0$ (a first change amount) and outputs a pulse signal of Lo→Hi (a decision signal)→Lo as a decision output at a time $t_2$ as shown in FIG. 7B.

The control section 73 stops the application of a voltage of $+V_d$ to the motor 25 as shown in FIG. 7C in response to the decision signal if any and applies a voltage of $-V_d$ for a constant time till a time $t_3$ to bring down the windowpane 15 in a constant amount, thereby releasing pinching or preventing the generation of the pinching. In the case in which a pressure to be applied to the pressure sensitive sensor 17 is to be released, a signal corresponding to an acceleration restoring the deformation (a smaller signal component than the reference potential $V_0$ in FIG. 7A) is output from the piezoelectric sensor 33.

In the deformation of the pressure sensitive sensor 17, the comparison of V with $V_0$ is changed depending on the direction of bending or polarization of the piezoelectric sensor 33, the allotment of an electrode (a decision of one of them to be a reference potential) and the direction of support of the piezoelectric sensor 33. Since the deciding section 63 decides the pinching based on the absolute value of the amplitude of V from $V_0$, the pinching can be decided irrespective of the comparison of V with $V_0$.

In addition to the basic deciding method, it is possible to prevent the generation of the pinching by deciding the presence of a contact with an object in the following manner.

Figure 8A:
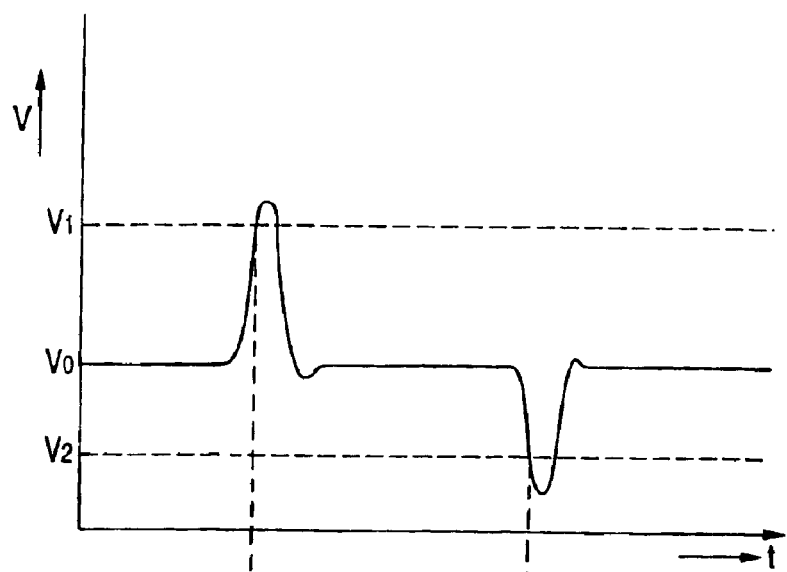
FIGS. 8A and 8B are another characteristic charts showing the output signal sent from the filtering section and the decision output of the deciding means.
Figure 8B:
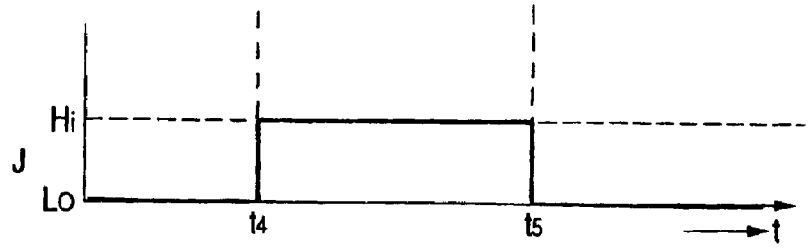

FIGS. 8A and 8B are characteristic charts showing an output signal V sent from the filtering section 62 and a decision output J of the deciding means 19. In FIGS. 8A and 8B, an axis of ordinate indicates V and J from the top and an axis of abscissa indicates a time t.

As shown in FIG. 8A, when the pressure sensitive sensor 17 is displaced by gripping the window frame 13 at a time $t_4$, a signal is output from the piezoelectric sensor 33 by the piezoelectric effect. As a result, a greater signal component than the reference potential $V_0$ is generated from the filtering section 62.

In the case in which the output signal V is equal to or greater than preset $V_1$, that is, the amplitude of $|V-V_0|$ of the output signal V from $V_0$ is greater than $V_1$ (a first change amount), the deciding section 63 decides that a contact with the object is caused, and outputs and holds a pulse signal Lo→Hi (decision signal) as a decision output at the time $t_4$ as shown in FIG. 8B. Next, when the window frame 13 is released to cancel the displacement of the pressure sensitive sensor 17, a signal is output from the piezoelectric sensor 33 by the same piezoelectric effect and a smaller signal component than the reference potential $V_0$ appears from the filtering section 62. At this time, in the case in which the output signal V is equal to or smaller than preset $V_2$, that is, the amplitude of $|V-V_0|$ of the output signal V from $V_0$ is greater than $V_2$ (a second change amount), the deciding section 63 decides that the object is separated and sets, to Hi→Lo, a pulse signal having an Hi level to be a decision signal at a time $t_5$. In other words, the pulse signal is maintained to be Hi and the output of the decision signal is held while the contact of the object is detected and the separation is then detected.

From the time $t_4$ that the decision signal is output and the contact of the object is then detected to the time $t_5$ that the separation of the object is detected, the control section 39 controls to lock the operation of the windowpane 15 even if the opening and closing switch 75 is operated to bring up or down the windowpane 15. Consequently, an obstacle is detected so that the generation of pinching can be prevented, resulting in an enhancement in safety.

The output signal V is changed depending on a polarity when the piezoelectric sensor 33 is to be polarized. In that case, the positive and negative signs of a signal shown in the drawing are reversed. Therefore, it is preferable that the positive and negative signs of the set values of $V_1$ and $V_2$ should be reversed.

Moreover, it is also possible to have such a structure that the control means 23 side to be connected can have the function of the deciding means 19, thereby separating the deciding means 19 from the pressure sensitive sensor 17, resulting in an enhancement in the management of the installation of the pressure sensitive sensor 17 itself.

Figure 15:
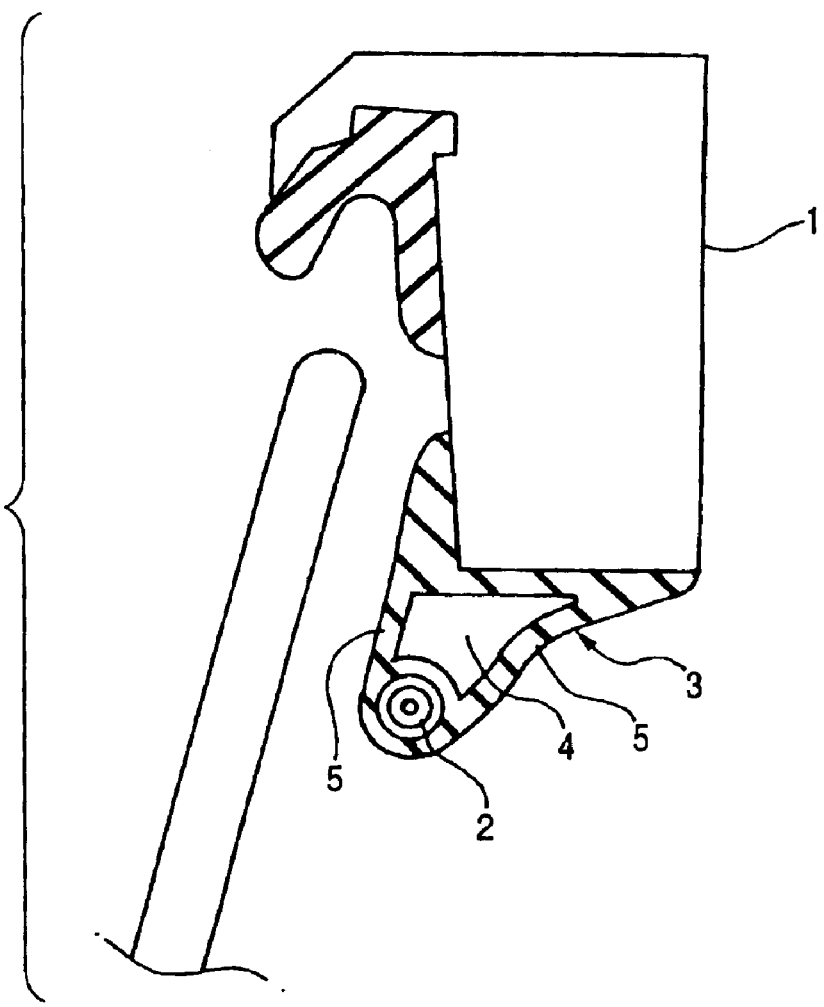
FIG. 15 is a sectional view showing an example in which a conventional pressure sensitive sensor for generating an output signal corresponding to an acceleration component is attached to a window frame.

Furthermore, in the case in which the contact and separation of the object is to be detected based on a signal output from the piezoelectric sensor 33, the structure of the conventional support means 35 shown in FIG. 15 may be employed.

Next, the function of the support means 35 will be described.

In addition to the basic structure, the pressure sensitive sensor 17 according to the invention has such a structure that the support means 35 has at least the first deformation section 37 and the second deformation section 39 so that the deformation can also be detected at time of the application of a static load and a pressure can be detected more reliably.

FIGS. 9A to 9C show states in which a pressure is detected in a compression state, FIG. 9A being an explanatory view showing the application of a static load, FIG. 9B being an explanatory view showing a state in which a pressure is further applied, and FIG. 9C being an explanatory view showing a state in which a pressure is detected to return a windowpane.

As shown in FIG. 9A, a state in which the window frame 13 is gripped is taken as an example in which the pressure sensitive sensor 17 has already been set in a compression state. Conventionally, even if a load in a compression direction is more applied, a displacement generated in the pressure sensitive sensor 17 is very small. In order to obtain a detection signal from the piezoelectric sensor 33 on a sufficient output level, accordingly, it is necessary to use the piezoelectric sensor 33 having a high sensitivity. For this reason, there is a problem in that a cost is increased. On the other hand, in the pressure sensitive sensor 17 according to the invention, the first deformation section 37 is connected to the window frame 13 through the second deformation section 39. Even if the first deformation section 37 is completely crushed in an initial state, therefore, the second deformation section 39 is mainly deformed when a pressure is further applied by the pressing of the windowpane 15 to bring a state shown in FIG. 9B. Also in the compression state in which the first deformation section 37 is crushed, consequently, the piezoelectric sensor 33 is deformed so that a detection signal can reliably be obtained at a sufficient output level. When the windowpane 15 is stopped and is started to be brought down upon receipt of the detection signal from the piezoelectric sensor 33 as described above, the original state of FIG. 9A is set again as shown in FIG. 9C.

Figure 10:
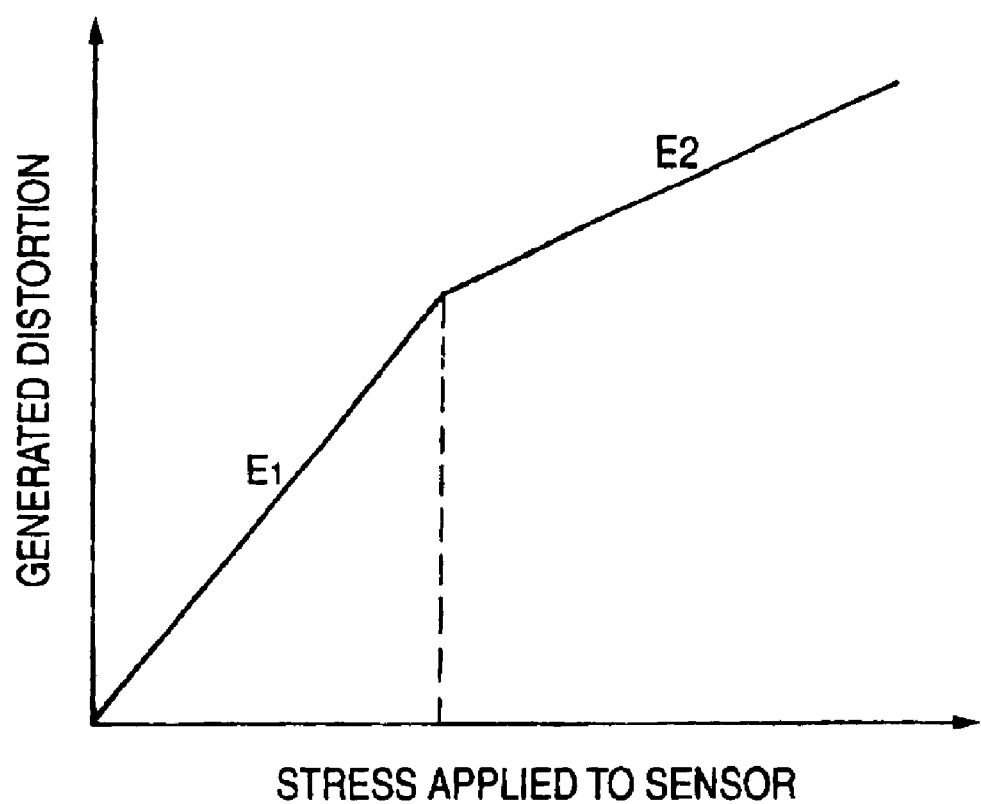
FIG. 10 is a graph representing the deformation characteristics of a first deformation section and a second deformation section.

FIG. 10 shows a graph representing the deformation characteristics of the first deformation section 37 and the second deformation section 39. In other words, the pressure sensitive sensor 17 is accommodated in the support means 35 having a plurality of (two in the embodiment) deformation characteristics. In the initial deformation of the pressure sensitive sensor 17 in which the whole window frame 13 is gripped, the first deformation section 37 having a small macro elastic modulus (E1) is mainly deformed correspondingly. After a compression state having a constant level is brought, the second deformation section 39 having a great macro elastic modulus (E2) is deformed mainly. By constituting the support means 35 to have a deformation behavior in a plurality of stages, a detection signal having a sufficient level for detection can be obtained from the piezoelectric sensor 33 even if the pressure sensitive sensor 17 is put under a stress.

In addition to the state in which the static load is applied and the first deformation section 37 is thus crushed, moreover, the second deformation section 39 is deformed also when a dynamic load such as a vibration is applied. Consequently, the applied pressure can be detected reliably at a low cost.

Next, a variant of the support means having the deformation characteristics will be sequentially described below. The same members as those shown in FIG. 2 have the same reference numerals and description thereof will be omitted.

Figure 11:
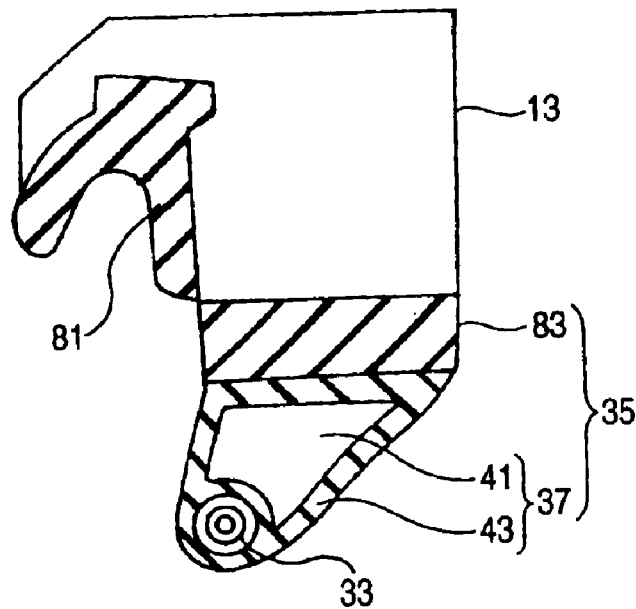
FIG. 11 is a sectional view showing a first variant in which a second deformation section is constituted separately from a weather strip.

FIG. 11 is a sectional view showing a first variant in which the second deformation section is constituted separately from the weather strip.

A first deformation section 37 according to the variant is formed separately from a weather strip 81 and is bonded to a second deformation section 83 fixed to a window frame 13. The second deformation section 83 is formed by a material having a greater elastic modulus E2 than a macro elastic modulus E1 of the first deformation section 37. For example, the second deformation section 83 may be formed of harder rubber than the first deformation section 37.

Thus, the second deformation section 83 is formed separately from the weather strip 81. Consequently, the degree of freedom of the design of the weather strip 81 can be enhanced, and furthermore, the bonding to the first deformation section 37 is eliminated so that the degree of freedom of material selection can also be enhanced.

Next, a second variant of the support means will be described.

Figure 12:
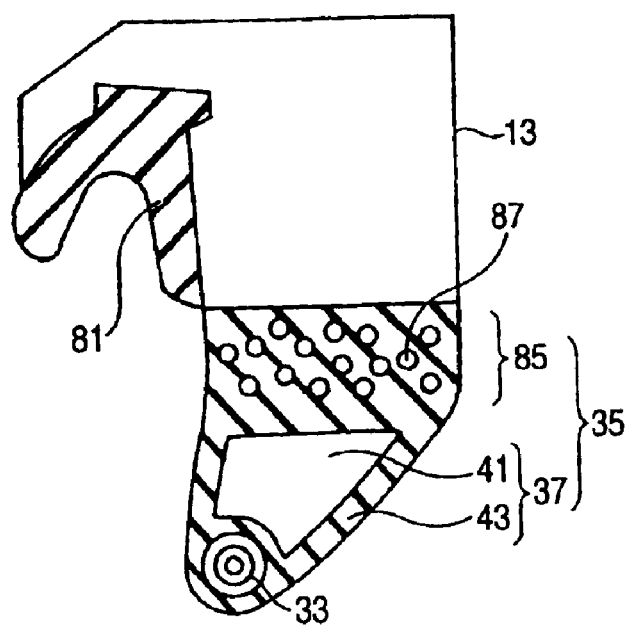
FIG. 12 is a sectional view showing a structure according to a second variant in which a second deformation section and a first deformation section are integrated.

FIG. 12 is a sectional view showing a structure according to the second variant in which a second deformation section is integrated with a first deformation section.

In the variant, a first deformation section 37 and a second deformation section 85 are formed integrally, and the second deformation section 85 has a gap 87 which is smaller than a hollow section 41 of the first deformation section 37. The gap 87 may comprise a plurality of bubbles shown in the drawing and a plurality of very small hollow sections may be formed. By the gap 87, the first deformation section 37 is crushed and the second deformation section 85 is then deformed. Thus, a pressure can be detected stably under a compressive stress. According to such a structure, moreover, the first deformation section and the second deformation section can be processed by integral molding. Consequently, a manufacturing process and an assembling process can be simplified.

Next, a third variant of the support means will be described.

Figure 13:
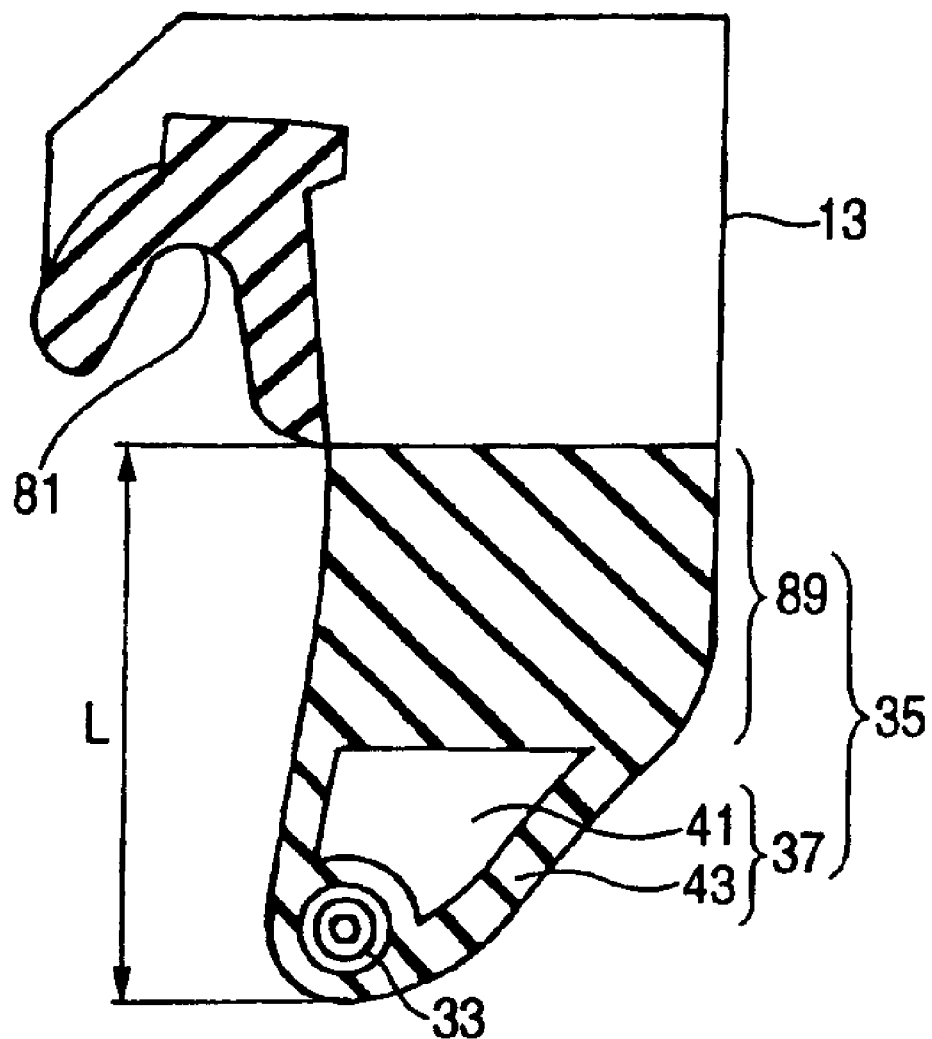
FIG. 13 is a sectional view showing a structure according to a third variant in which a second deformation section and a first deformation section are integrated.

FIG. 13 is a sectional view showing a structure according to the third variant in which a second deformation section and a first deformation section are integrated.

In the variant, a first deformation section 37 and a second deformation section 89 are formed integrally and the second deformation section 89 has a great thickness such that a distance L from a window frame 13 on the fixing side of support means 35 has a predetermined value or more. By the distance L, the first deformation section 37 is crushed and the second deformation section 89 is then deformed by its own elasticity. Consequently, a pressure can be detected stably under a compressive stress. Conventionally, the amount of the deformation of the second deformation section 89 is very small because the distance L is short. Consequently, a sufficient deformation margin cannot be taken. By increasing the distance L, however, the piezoelectric sensor 33 can easily be deformed and a pressure can be detected stably. Moreover, the first deformation section 37 and the second deformation section 89 can readily be molded integrally.

Figure 14A:
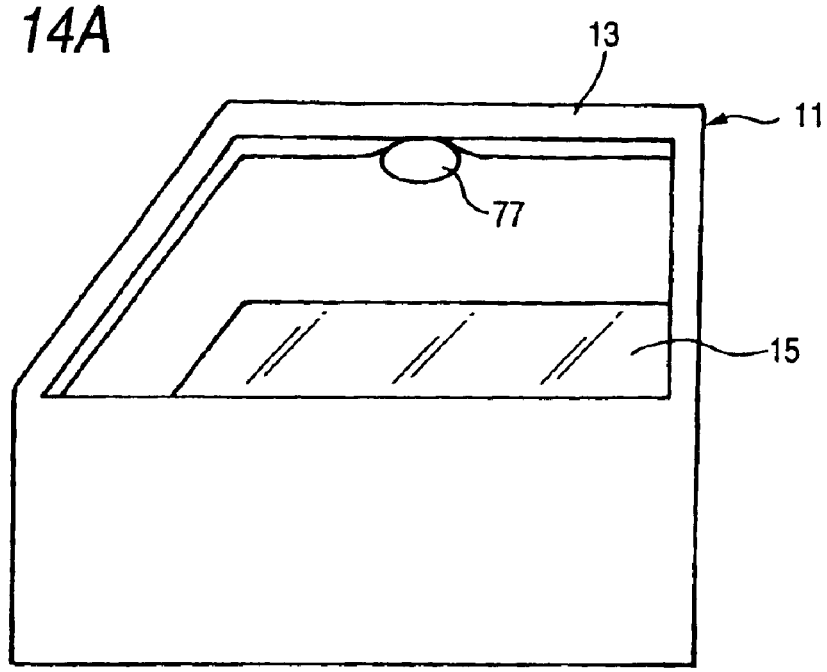
FIGS. 14A and 14B are views showing a state in which an object presses a pressure sensitive sensor during the closing operation of a windowpane, FIG. 14A being an explanatory view showing a state obtained before the deformation of a window frame and FIG. 14B being an explanatory view showing a state obtained after the deformation of the window frame.
Figure 14B:
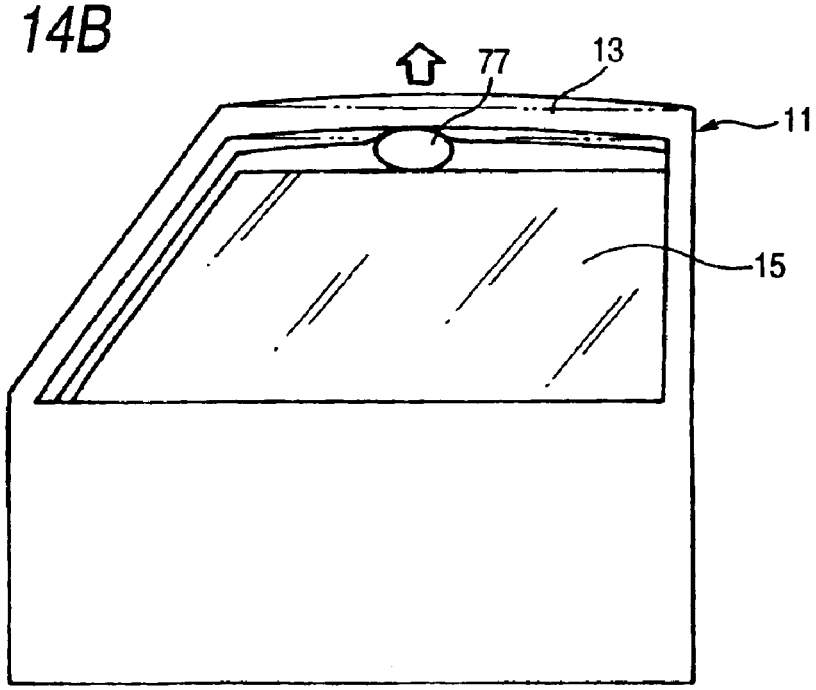

In addition to the structure according to each of the variants, the following structure can also be employed. More specifically, as shown in FIG. 14A, in the case in which an object 77 presses the pressure sensitive sensor 17 during the closing operation of a windowpane, the pressure sensitive sensor 17 does not detect that the windowpane 15 is pressed against the object 77 when the window frame 13 has a high rigidity. By setting the rigidity of the window frame 13 to be lower by a predetermined amount, however, the window frame 13 is elastically deformed and flexed when the windowpane 15 is pressed against the object 77 as shown in FIG. 14B. By the flexure, a detection signal having a sufficient output level can be obtained from the piezoelectric sensor. More specifically, the window frame 13 has the function of the second deformation section.

According to the pressure sensitive sensor, the object detecting device and the opening and closing device described above, the processing of a signal sent from the piezoelectric sensor is varied or the shape of the support means is changed. Consequently, a detection capability can be enhanced at a low cost. In other words, also in the case in which external force is suddenly applied to the pressure sensitive sensor, a time taken from the start of a contact to the end thereof is recognized based on a signal output from the piezoelectric sensor and a driving operation for this period can be locked. Also in the case in which external force is applied under a static pressure in which a pressure is preloaded to the pressure sensitive sensor, moreover, the second deformation section of the support member is deformed so that a signal having a sufficient output level can be obtained from the piezoelectric sensor and reliable detection can be carried out. By these effects, an obstacle can be detected reliably to prevent pinching so that stability can be enhanced still more.

Moreover, the invention is not restricted to a pressure sensitive sensor to be provided in the window frame of a car but can also be applied to the slide door of the side surface of a body in a car, an electrically operated sunroof provided on the ceiling of the body, an electrically operated hatch door in the rear part of the body or an electrically operated trunk, for example, and the same advantages as those described above can be obtained. Furthermore, the invention is not restricted to the car but can also be applied to an automatic door of a train or a building.

According to the invention, an object can be detected stably with high precision at a low cost in any situation by using the piezoelectric sensor for detecting an acceleration component, can enhance the effect of detecting an obstacle and preventing pinching, and can improve safety still more.

Second Embodiment

Figure 2B:
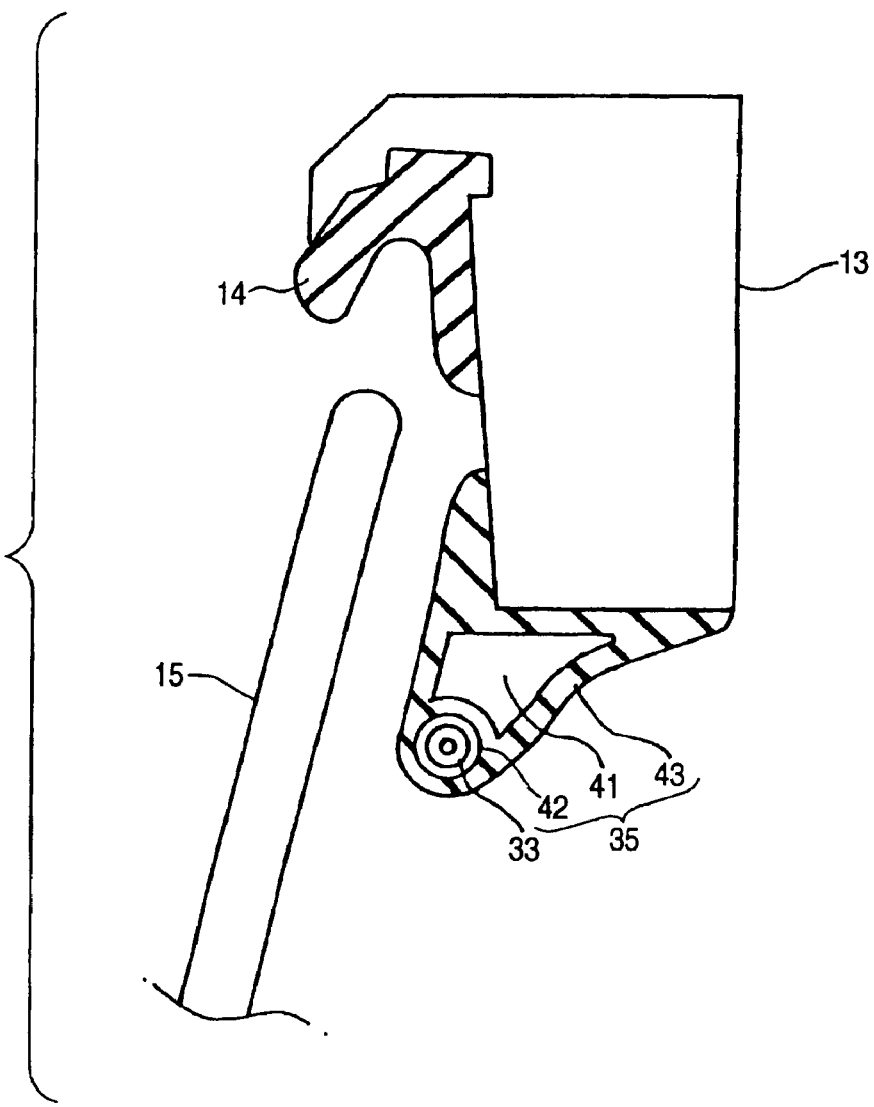

As shown in FIG. 2B, the pressure sensitive sensor 17 according to the second embodiment comprises a flexible piezoelectric element member 33 to be voltage sensing means, and elastic support means 35 having a hollow section 42 for inserting and supporting the piezoelectric element member 33.

The elastic support means 35 is formed by an elastic member such as synthetic rubber or a foamed resin member, and is attached along the edge of the window frame 13 in order to fulfill the function as a packing by adhesion to the windowpane 15 and the function for buffering the contact section of the windowpane 15, and is provided with the hollow section 42 for inserting the piezoelectric element member 33 in the vicinity of a lowermost section thereof.

Remaining configurations are equivalent to that of the first embodiment.

Figure 16:
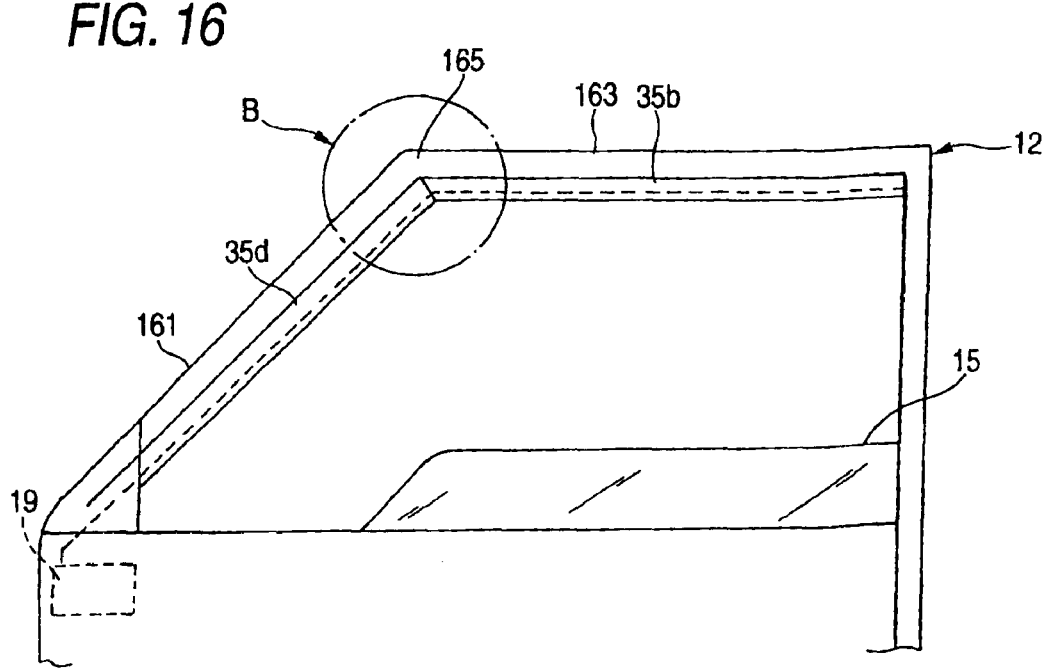
FIG. 16 is an enlarged view showing the window frame of a vehicle for explaining the pressure sensitive sensor attachment structure according to the invention.

In the pinching detecting device 100 and the opening and closing device 150 according to the second embodiment, the elastic support means 35 is stuck, over an almost whole length, onto an inclined surface 161 of the window frame 13 opposed to the upper edge of the windowpane 15 and the other side connected thereto through a corner section, that is, a horizontal upper side 163 crossing the upper end of the inclined side 161 almost horizontally respectively as shown in FIG. 16.

Figure 17:
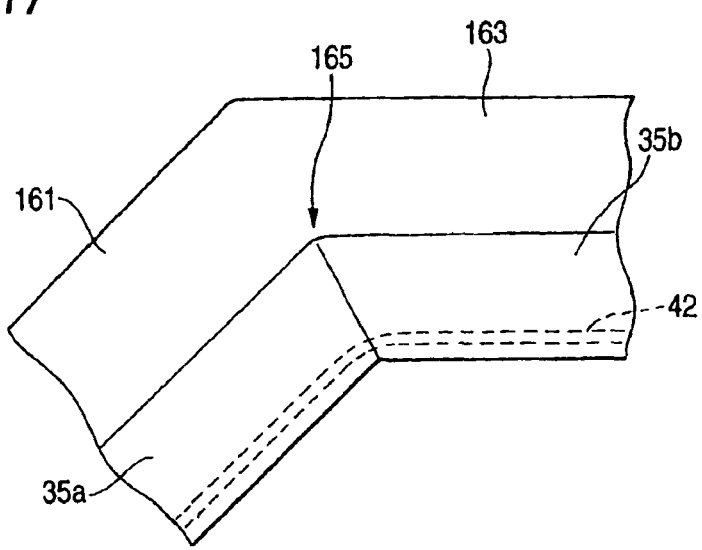
FIG. 17 is an enlarged view showing a B section in FIG. 16.

In the corner section 165 of the window frame 13 at which the inclined side 161 crosses the horizontal upper side 163, the butt ends of the elastic support means 35a stuck to the inclined side 161 and the elastic support means 35b stuck to the horizontal upper side 163 are cut obliquely at a predetermined angle and are then bonded such that the hollow section 42 for inserting the piezoelectric element member of each of the elastic support means 35a and 35b smoothly communicates at the butt ends of the respective elastic support means 35a and 35b as shown in FIG. 17 to be an enlarged view illustrating a B portion in FIG. 16.

The pressure sensitive sensor 17 according to the embodiment has such an attachment structure that one long piezoelectric element member 33 is inserted in the communicating hollow section 42 of the respective elastic support means 35a and 35b and is connected to the deciding means 19.

In the attachment structure of the pressure sensitive sensor 17 having such a structure, the piezoelectric element member 33 is continuous. For this reason, an insensitive part is not present in the corner section 165 and a whole region in which the pressure of the window frame 13 is to be detected can be set to be a pressure detection region without a clearance. Moreover, the pressure sensitive sensor 17 is a piezoelectric element for outputting an electric signal corresponding to a deformation acceleration in the elastic deformation. Also in the case in which the pressure sensitive sensor 17 is provided in the corner section 165 of the window frame 13 in a bending state, therefore, the bent section of the piezoelectric element member 33 for the provision is deformed and a signal indicative of pinching is not output until elastic deformation is newly received. Accordingly, the pressure sensitive sensor 17 can be provided without a hindrance such as erroneous detection across the corner section 165 of the window frame.

Moreover, the pressure sensitive sensor 17 is a piezoelectric element for outputting an electric signal corresponding to a deformation acceleration in elastic deformation. As compared with a conventional pressure sensitive sensor 17 for outputting a signal by a contact of contact wires during the elastic deformation in a constant amount, therefore, a signal indicative of the generation of slight elastic deformation can also be output quickly.

Figure 18A:
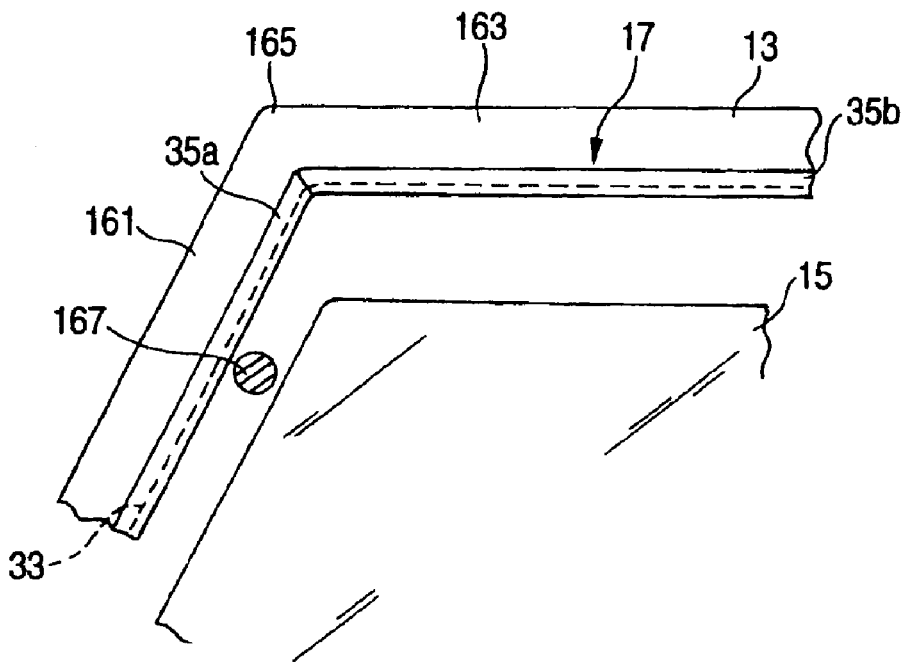
FIG. 18 is a view for explaining an operation to be carried out in the case in which an object is pinched on the inclined side of a window frame with the pressure sensitive sensor attachment structure according to an embodiment of the invention.
Figure 18B:
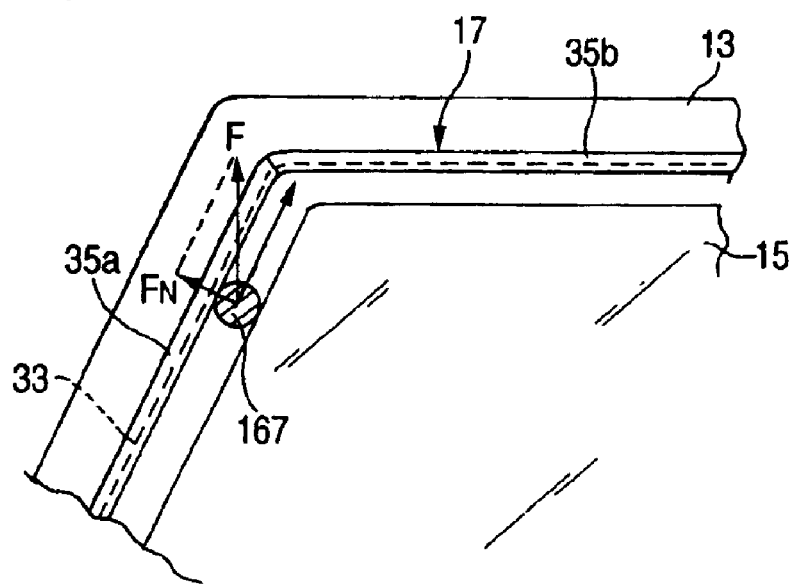

For example, as shown in FIG. 18A, in the case in which an object 167 is pinched within a range of the inclined side 161 of the window frame 13 as shown in FIG. 18A, a component of force FN in a direction orthogonal to an inclined side which generates elastic deformation on the piezoelectric element member 33 of the inclined side 161 is much smaller than energizing force F in the closing direction of the windowpane 15 as shown in FIG. 18B so that only small elastic deformation is generated when the object 167 is pinched. However, the piezoelectric element member 33 outputs a signal corresponding to the deformation acceleration of slight elastic deformation. Therefore, the pinching can be detected reliably and rapidly on the deciding means 19 side.

More specifically, the pressure sensitive sensor 17 according to the embodiment can detect the generation of the pinching reliably and rapidly also in the case in which it is provided in the inclined section and the corner section 165 in the window frame 13. Therefore, the single long pressure sensitive sensor 17 is continuously provided over a whole provision region on the window frame including the inclined section thereof and the corner section 165. Thus, only one pressure sensitive sensor 17 to be provided is enough. As a result, the number of the pressure sensitive sensors 17 to be used for one opening section is reduced to one and the processing of a signal line led from the pressure sensitive sensor 17 can easily be carried out as described in the embodiment.

Figure 19:
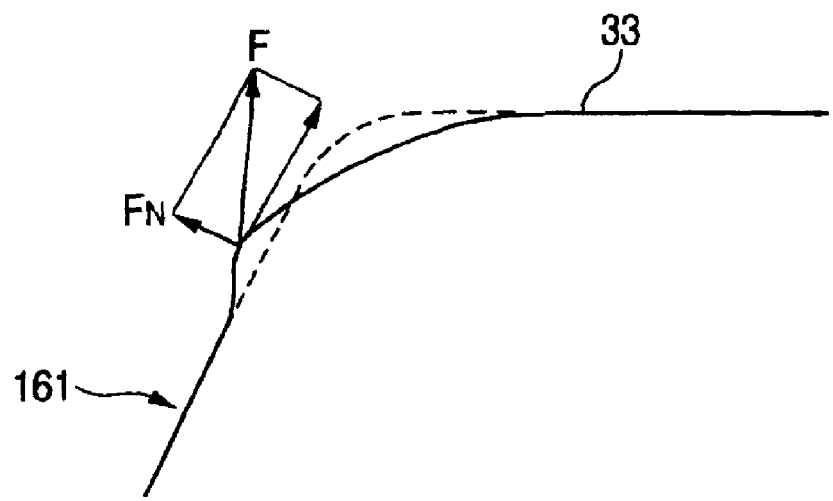
FIG. 19 is a view for complementarily explaining deformation generated in a piezoelectric element member in the case in which the object is pinched on the inclined side of the window frame with the pressure sensitive sensor attachment structure according to the embodiment of the invention.

In the embodiment, moreover, the pressure sensitive sensor 17 to be provided in one opening is set to be the single long piezoelectric element member 33. For example, also in the case in which the object is pinched in the inclined side 161 as described above and elastic deformation toward the contact section of the object is small at that time, therefore, one continuous piezoelectric element member 33 is pulled in the acting position of pressing force $F_N$ generated by the contact of the object as shown in FIG. 19 and a section other than the contact section with the object is also deformed up to the circumference of the contact section as shown in a solid line from a position shown in a broken line of FIG. 19 and a signal corresponding to a deformation acceleration is output by the surrounding deformation. Therefore, a great detection signal can be output as a whole of the piezoelectric element member 33 so that the contact of the object can be detected reliably and rapidly.

In the embodiment, moreover, the piezoelectric element member 33 is formed by a compound piezoelectric member mixing chlorinated polyethylene and piezoelectric ceramics powder. With such a structure, the piezoelectric element member 33 can maintain a flexibility with which a section is greatly deformed by the action of slight external force. Also in the case in which force acting when pinching is generated becomes a smaller component of force than force for closing the windowpane as in the inclined section of the window frame of a front door in a vehicle, therefore, the piezoelectric element member 33 can be greatly deformed elastically when the pinching is generated, thereby detecting the pinching reliably and rapidly.

In the opening and closing device 150 having the pressure sensitive sensor 17 attached there to as described above, moreover, in the case in which an object is pinched between the windowpane 15 and the edge of the window frame 13 during an operation for closing the windowpane 15 to be an opening and closing member, the pressure sensitive sensor 17 having the attachment structure detects the generation of the pinching reliably and rapidly and an operation for closing the opening and closing member is stopped or an operation for opening the opening and closing member is started immediately based on the result of the detection. Consequently, it is possible to reliably prevent an accident from being caused by the detection delay of the pinching or detection failures.

Accordingly, the opening and closing device 150 is very useful for preventing a hand or a finger from being damaged by pinching in a power window device for opening and closing the windowpane of a vehicle by means of an electric motor.

Next, another embodiment according to the invention will be described.

Figure 20A:
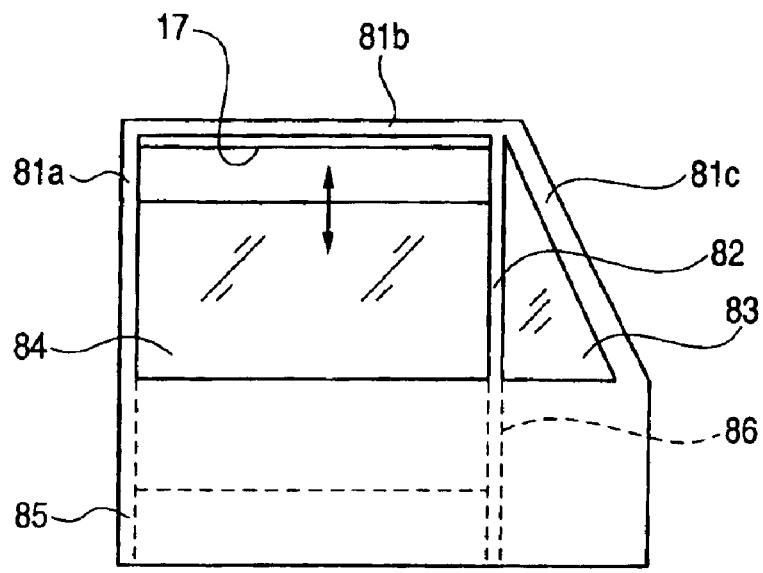
FIGS. 20A and 20B are views showing an example of the structure of a door section on the rear seat side of a car, FIG. 20A being a view showing a structure in which a partition frame is provided in addition to a window frame and FIG. 20B being a view showing a structure in which the partition frame is not provided.
Figure 20B:
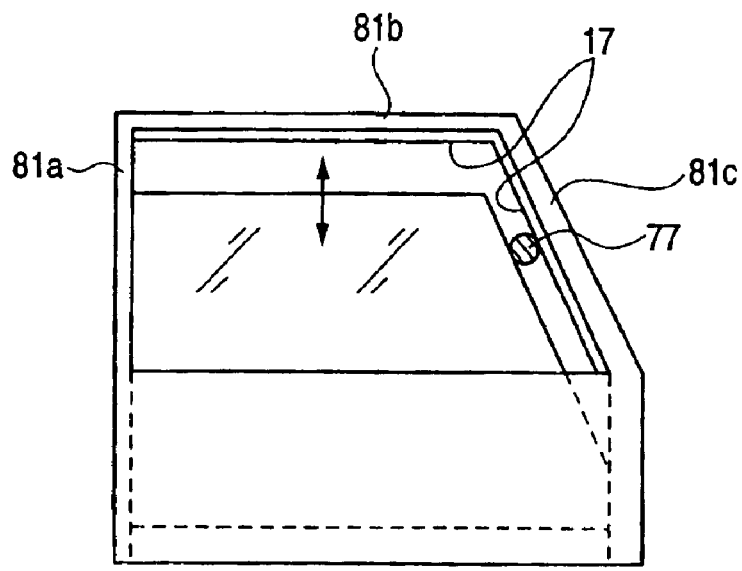

FIGS. 20A to 20B show examples of the structure of a door section on the rear seat side of a car. FIG. 20A shows such a structure that a partition frame 82 is provided in addition to window frames 81a, 81b and 81c and a fixed window 83 is provided between the partition frame 82 and the window frames 81a, 81b and 81c, and a windowpane 84 is brought up and down without a clearance between the window frame 81a and a guide 85 connected thereto and the partition frame 82 and a guide 86 connected thereto. In this case, it is preferable that the pressure sensitive sensor 17 should be provided in only the window frame 81b in order to prevent an object from being pinched.

In recent years, however, there have been so many structures in which a partition frame is not provided as shown in FIG. 20B in respect of a design. With such a structure, when the windowpane 84 is brought up and down, a clearance is generated between the windowpane 84 and the window frame 81c. For this reason, it is necessary to prevent an object from being pinched in the clearance. However, when a conventional pressure sensitive sensor of a contact type is provided in the inclined window frame 81c, erroneous detection is caused by the connection of a contact or force acting on the pressure sensitive sensor 17 becomes a component of force as described above. As a result, there is a drawback that the pinching of the object cannot be detected quickly.

By providing the pressure sensitive sensor according to the invention in the window frame 81c, therefore, a signal indicative of generation of slight elastic deformation can be output quickly because the pressure sensitive sensor is constituted by the piezoelectric element. Thus, the pinching of the object between the window frame 81c and the windowpane 84 can be detected reliably and rapidly.

Moreover, since the piezoelectric element member 33 of the pressure sensitive sensor 17 according to the invention can be bent, it may be provided from the window frame 81c toward the window frame 81b. In that case, it is possible to detect pinching in both regions of the window frames 81b and 81c by means of one pressure sensitive sensor.

It is preferable that the elastic support means 35 according to each of the embodiments described above should be subjected to a high friction processing for causing an object to slide over a surface with difficulty in the direction of provision of the pressure sensitive sensor during a contact with the object in a region provided in at least the inclined section of the window frame. Consequently, the object can be prevented from sliding over the surface of the elastic support means 35 following the operation of the windowpane.

The high friction processing includes the following specific examples. More specifically, the processing can be carried out by a method of forming very small concavo-convex shapes simultaneously with the extrusion molding of the elastic support means 35, a method of forming the elastic support means 35 by the extrusion molding and then pushing a thermal mold to finish a crimped surface, and a method of forming concavo-convex sections on the surface of the elastic support means 35 after the molding by means of a grinder or a sandpaper and roughing the same surface. Moreover, the surface of the elastic support means 35 may be subjected to coating. For example, a coating material such as an urethane based or epoxy based material having a high coefficient of static friction or a viscous material having a low viscosity is applied so that a coating layer having a high friction can be formed. Furthermore, the elastic support means 35 may be formed of a material which is rarely slippery.

In the case in which a rubber material is generally applied to industrial products such as a car, moreover, the provision of a low frictional coating layer on a surface is extensively carried out in order to reduce a friction and to enhance beauty and durability. It is preferable that the elastic support means 35 should have a high friction. Therefore, it is preferable that the surface of the whole elastic support means 35 or a part thereof should be a surface from which a material surface having no low frictional coating layer is exposed. More specifically, at least a section for detecting an object is not subjected to low friction coating but is brought into an almost exact surface state after a material processing such as extrusion molding. Then, the section for detecting an object may be masked and the other sections may be subjected to the low friction coating if necessary. Consequently, it is possible to form a high frictional surface on the elastic support means 35 by simply changing a manufacturing process.

Preferably, the high friction processing is not restricted to the elastic support member 35 but is carried out for the weather strip 14 (see FIG. 2B) in the same manner.

Although the above-described second embodiment, the elastic support member 35 as shown in FIG. 2B is used. It should be understand that it can be used the elastic support member 35 having first deformable portion 37 and second deformable portion 39 as shown in FIG. 2A of the first embodiment.

Figure 21:
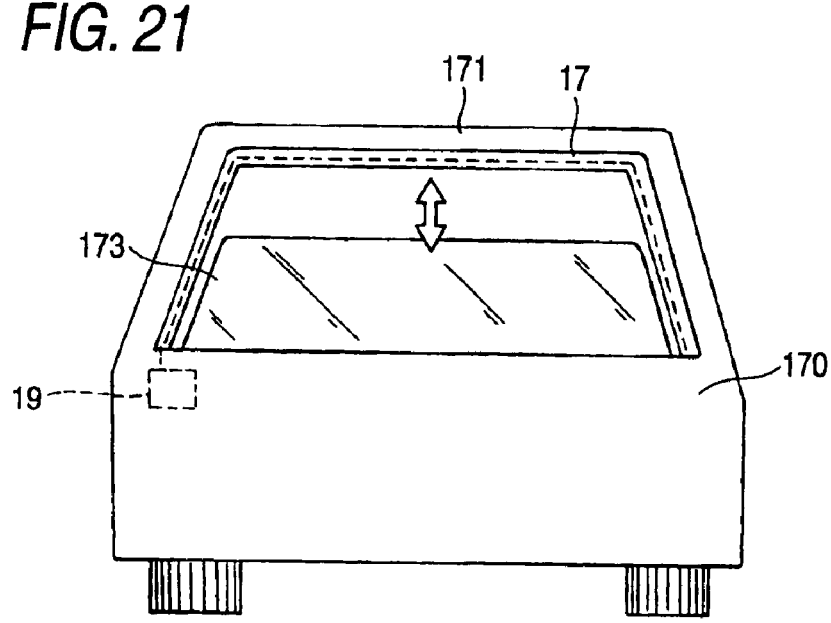
FIG. 21 is an explanatory view showing another section of a car to which the pressure sensitive sensor attachment structure and the opening and closing device according to the invention are applied.
Figure 22A:
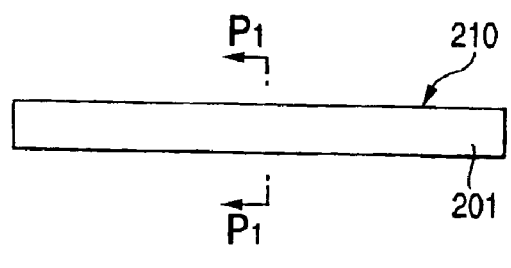
FIGS. 22A and 22B are explanatory views showing a pressure sensitive sensor to be used in a conventional pinching detecting device, FIG. 22A being a side view and FIG. 22B being a sectional view taken along a P1—P1 line in FIG. 22A.
Figure 22B:
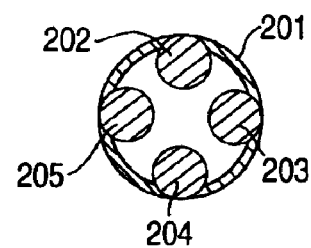
Figure 23A:
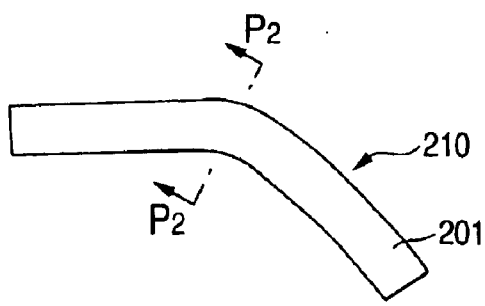
FIGS. 23A and 23B are explanatory views showing a state in which the pressure sensitive sensor to be used in the conventional pinching detecting device is bent, FIG. 23A being a side view and FIG. 23B being a sectional view taken along a P2—P2 line in FIG. 23A.
Figure 23B:
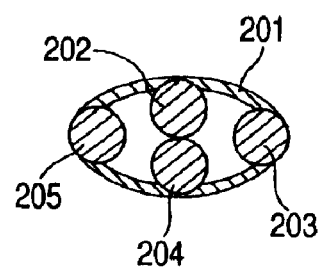

The application object of the pressure sensitive sensor attachment structure and the opening and closing device according to the invention is not restricted to the power window device of a front or rear seat in a car described in the embodiment. As shown in FIG. 21, they can also be applied to an electrically operated back door window 175 for electrically opening and closing a windowpane 173 with respect to a window frame 171 of a back door 170 of a car.

Moreover, the invention is not restricted to a pressure sensitive sensor to be provided in the window frame of a car but can also be applied to the slide door of the side surface of a body in a car, an electrically operated sunroof provided on the ceiling of the body, an electrically operated hatch door in the rear part of the body or an electrically operated trunk, for example, and the same advantages as those described above can be produced. Furthermore, the invention is not restricted to the car but can also be applied to an automatic door of a train or a building.

According to the pressure sensitive sensor attachment structure of the invention, a pressure sensitive sensor is a piezoelectric element for outputting an electric signal corresponding to a deformation acceleration in elastic deformation. Even if the pressure sensitive sensor is provided in a corner section in a bending state, therefore, a signal indicative of pinching is not output until a bent section for the provision is newly deformed by pinching an object. Thus, the pressure sensitive sensor can be provided across the corner section such as a window frame. Moreover, the pressure sensitive sensor is the piezoelectric element. As compared with a conventional pressure sensitive sensor for outputting a signal by a contact of contact wires during elastic deformation in a constant amount, therefore, a signal indicative of the generation of slight elastic deformation can be output quickly. For example, also in the case in which the pressure sensitive sensor is provided on the inclined side of the window frame, the generation of pinching can be detected reliably and rapidly.

Accordingly, a single long pressure sensitive sensor can be continuously provided over the whole provision region on the window frame including the inclined section and the corner section in the window frame and only one pressure sensitive sensor to be provided is enough. Consequently, the number of the pressure sensitive sensors to be used is reduced to one for one opening section and the processing of a lead wire led from the pressure sensitive sensor can easily be carried out.

In the opening and closing device according to the invention, moreover, in the case in which an object is pinched between an opening and closing member and the edge of an opening section during the closing operation of the opening and closing member, the pressure sensitive sensor attached with the pressure sensitive sensor attachment structure detects the generation of the pinching reliably and quickly. Based on the result of the detection, the closing operation of the opening and closing member is stopped or the opening operation of the opening and closing member is started immediately. Therefore, it is possible to reliably prevent an accident from being caused by the detection delay of the pinching or detection failures. In a power window device for opening and closing the windowpane of a vehicle by an electric motor, accordingly, the opening and closing device is very useful for preventing a hand or a finger from being damaged by pinching.

What is claimed is:

1. A pressure sensitive sensor provided in at least one of an opening section and an opening-and-closing section for opening and closing the opening section and serving to detect pinching of an object between the opening section and the opening and closing section based on an output signal generated by deformation upon receipt of external force, said pressure sensitive sensor comprising:

pressure sensitive means for generating an output signal corresponding to deformation; and support means for supporting the pressure sensitive means on at least one of the opening section and the opening and closing section;

the support means including at least a first deformation section having a first elastic modulus and serving to increase deformation of the pressure sensitive sensor; and a second deformation section having a second elastic modulus which is higher than the first elastic modulus.

2. The pressure sensitive sensor according to claim 1, wherein the first deformation section has a hollow section and a side wall section.

3. The pressure sensitive sensor according to claim 1, wherein the first deformation section and the second deformation section are formed separately and are bonded to each other.

4. The pressure sensitive sensor according to claim 1, wherein the second deformation section is formed integrally with a part of a weather strip of a car.

5. The pressure sensitive sensor according to claim 1, wherein the second deformation section is a window frame of a car.

6. The pressure sensitive sensor according to claim 2, wherein the first deformation section and the second deformation section are formed integrally and the second deformation section has a smaller gap than the hollow section.

7. The pressure sensitive sensor according to claim 1, wherein the pressure sensitive means is molded by using a compound piezoelectric member mixing chlorinated polyethylene and piezoelectric ceramics powder.

8. A pressure sensitive sensor as claimed in claim 1, wherein the pressure sensitive sensor has a flexibility and is long, and is inserted in elastic support means to be supported on the opening section or the opening and closing member, and is provided on at least the inclined side of the opening section.

9. A pressure sensitive sensor as claimed in claim 1, wherein the pressure sensitive sensor has a flexibility and is formed like a long shaft, and is inserted in elastic support means to be supported on the opening section or the opening and closing member, and
   the single continuous pressure sensitive sensor is inserted in the elastic support means in a region including the inclined side and another side.

10. An object detecting device comprising:
   a pressure sensitive sensor provided in at least one of an opening section and an opening-and-closing section for opening and closing the opening section and serving to detect pinching of an object between the opening section and the opening and closing section based on an output signal generated by deformation upon receipt of external force, said pressure sensitive sensor including:
      pressure sensitive means for generating an output signal corresponding to deformation; and
      support means for supporting the pressure sensitive means on at least one of the opening section and the opening and closing section;
      the support means including at least a first deformation section having a first elastic modulus and serving to increase deformation of the pressure sensitive sensor; and
      a second deformation section having a second elastic modulus which is higher than the first elastic modulus; and
   deciding means for deciding presence of a contact of an object with the pressure sensitive sensor based on a signal output from the pressure sensitive sensor.

11. The object detecting device according to claim 10, wherein the deciding means outputs a decision signal when the signal output from the pressure sensitive means has a preset first change amount or more.

12. The object detecting device according to claim 11, wherein the deciding means holds the decision signal until the signal output from the pressure sensitive means which has a different polarity from the polarity of the output signal has a preset second change amount or more after the signal output from the pressure sensitive means has the first change amount or more.

13. An opening and closing device comprising the object detecting device according to claim 10, driving means for driving an opening and closing section, and control means for controlling the driving means to stop a closing operation of the opening and closing section or to cause the opening and closing section to carry out an opening operation when deciding means decides a contact of an object with a pressure sensitive sensor when the opening and closing section carries out the closing operation.

14. An object detecting device as claimed in claim 10, wherein the pressure sensitive sensor has a flexibility and is long, and is inserted in elastic support means to be supported on the opening section or the opening and closing member, and is provided on at least the inclined side of the opening section.

15. An object detecting device as claimed in claim 10, wherein the pressure sensitive sensor has a flexibility and is formed like a long shaft, and is inserted in elastic support means to be supported on the opening section or the opening and closing member, and
   the single continuous pressure sensitive sensor is inserted in the elastic support means in a region including the inclined side and another side.

16. An object detecting device comprising:
   a pressure sensitive sensor provided in at least one of an opening section and an opening and closing section for opening and closing the opening section and serving to detect pinching of an object between the opening section and the opening and closing section based on an output signal generated by deformation upon receipt of external force; and
   deciding means for deciding presence of a contact of the object with the pressure sensitive sensor based on a signal output from the pressure sensitive sensor;
   wherein the pressure sensitive sensor includes pressure sensitive means for generating an output signal corresponding to deformation and support means for supporting the pressure sensitive means on at least one of the opening section and the opening and closing section, and
   the deciding means outputs a decision signal when the signal output from the pressure sensitive means reaches a preset first change amount, and holds the decision signal until the signal output from the pressure sensitive means which has a different polarity from the polarity of the output signal has a preset second change amount or more after the decision signal is output.

17. An object detecting device as claimed in claim 16, wherein the pressure sensitive sensor has a flexibility and is long, and is inserted in elastic support means to be supported on the opening section or the opening and closing member, and is provided on at least the inclined side of the opening section.

18. An object detecting device as claimed in claim 16, wherein the pressure sensitive sensor has a flexibility and is formed like a long shaft, and is inserted in elastic support means to be supported on the opening section or the opening and closing member, and
   the single continuous pressure sensitive sensor is inserted in the elastic support means in a region including the inclined side and another side.

19. An opening and closing device comprising:

an object detecting device comprising:
- a pressure sensitive sensor provided in at least one of an opening section and an opening and closing section for opening and closing the opening section and serving to detect pinching of an object between the opening section and the opening and closing section based on an output signal generated by deformation upon receipt of external force; and
- deciding means for deciding presence of a contact of the object with the pressure sensitive sensor based on a signal output from the pressure sensitive sensor;
- wherein the pressure sensitive sensor includes pressure sensitive means for generating an output signal corresponding to deformation and support means for supporting the pressure sensitive means on at least one of the opening section and the opening and closing section, and
- the deciding means outputs a decision signal when the signal output from the pressure sensitive means reaches a preset first change amount, and holds the decision signal until the signal output from the pressure sensitive means which has a different polarity from the polarity of the output signal has a preset second change amount or more after the decision signal is output;

driving means for driving an opening and closing section; and control means for controlling the driving means to stop a closing operation of the opening and closing section or to cause the opening and closing section to carry out an opening operation when deciding means decides a contact of an object with a pressure sensitive sensor when the opening and closing section carries out the closing operation.

20. An opening and closing device as claimed in claim 19, wherein the pressure sensitive sensor has a flexibility and is long, and is inserted in elastic support means to be supported on the opening section or the opening and closing member, and is provided on at least the inclined side of the opening section.

21. An opening and closing device as claimed in claim 19, wherein the pressure sensitive sensor has a flexibility and is formed like a long shaft, and is inserted in elastic support means to be supported on the opening section or the opening and closing member, and
- the single continuous pressure sensitive sensor is inserted in the elastic support means in a region including the inclined side and another side.

* * * * *

UNITED STATES PATENT AND TRADEMARK OFFICE
CERTIFICATE OF CORRECTION

PATENT NO.       : 6,883,382 B2
APPLICATION NO.  : 10/352960
DATED            : April 26, 2005
INVENTOR(S)      : Ogino et al.

It is certified that error appears in the above-identified patent and that said Letters Patent is hereby corrected as shown below:

<u>On the title page</u>

Item (73), Assignee, please delete "Matsushita Electric Industrial Co., Inc., Osaka (JP)"

and insert therefor --Matsushita Electric Industrial Co., Ltd., Osaka (JP)--.

Signed and Sealed this

Fifth Day of September, 2006

JON W. DUDAS
*Director of the United States Patent and Trademark Office*